(12) United States Patent
Funaoka

(10) Patent No.: US 7,323,501 B2
(45) Date of Patent: *Jan. 29, 2008

(54) LIGNIN DERIVATIVES, MOLDED PRODUCTS USING THE SAME AND PROCESSES FOR MAKING THE SAME

(75) Inventor: Masamitsu Funaoka, 191-2, Torii-cho, Tsu-shi, Mie-ken (JP)

(73) Assignees: Kabushiki Kaisha Maruto, Yokkaichi (JP); Masamitsu Funaoka, Tsu (JP)

( * ) Notice: Subject to any disclaimer, the term of this patent is extended or adjusted under 35 U.S.C. 154(b) by 103 days.

This patent is subject to a terminal disclaimer.

(21) Appl. No.: 11/003,212

(22) Filed: Dec. 2, 2004

(65) Prior Publication Data

US 2005/0154194 A1 Jul. 14, 2005

Related U.S. Application Data

(60) Division of application No. 10/619,930, filed on Jul. 15, 2003, now Pat. No. 6,841,660, which is a continuation of application No. 09/508,592.

(51) Int. Cl.
*C08L 97/00* (2006.01)

(52) U.S. Cl. .................. 524/72; 530/502; 264/330

(58) Field of Classification Search ............ 524/72; 530/502; 264/330
See application file for complete search history.

(56) References Cited

U.S. PATENT DOCUMENTS

| 4,764,597 A | 8/1988 | Dilling |
| 4,769,434 A | 9/1988 | Van der Klashorst et al. |
| 5,010,156 A | 4/1991 | Cook et al. |
| 6,632,931 B1 | 10/2003 | Funaoka |
| 6,841,660 B1 | 1/2005 | Funaoka |

FOREIGN PATENT DOCUMENTS

| JP | 1-16840 | 1/1989 |
| JP | 2-233701 | 9/1990 |
| JP | 7-196923 | 8/1995 |
| JP | 9-278904 | 10/1997 |
| JP | 2000-72888 | 3/2000 |
| RO | 97 848 | 1/1990 |

OTHER PUBLICATIONS

Brunow, "On the Acid-catalysed Alkylation of Lignings," Holzforschung, vol. 45, No. 1, pp. 37-40, 1991.
Ede et al., "Formic Acid/Peroxyformic Acid Pulping," Holzforschung, vol. 43, No. 2, pp. 127-129,1989.
Gierer et al., "Studies on the Condesation of Lignins in Alkaline Media Part II," Can. J. Chem., vol. 55, No. 4, pp. 593-599, 1977.
Yasuda et al., "Chemical Structures of Sulfuric Acid Lignin," Holzforchung, vol. 41, No. 1, pp. 59-65, 1987.
M. Maeda, et al., "Construction of a Recyclable Formed Body by Mixing a Lignophenol Derivative with Cellular Fibers," Nihon Mokuzai Gakkai Chubu Shibu Taikai, pp. 52-53 (Oct. 16, 1995) (with English translation).

*Primary Examiner*—Peter Szekely
(74) *Attorney, Agent, or Firm*—Oliff & Berridge, PLC

(57) ABSTRACT

The present invention provides a process for producing novel lignin derivatives, which comprises using a lignophenol derivative containing a diphenylpropane unit formed by binding a carbon atom at an ortho-position relative to a phenolic hydroxyl group of a phenol derivative to a carbon atom at a benzyl-position of a phenylpropane fundamental unit of lignin, and binding an oxygen atom of the hydroxyl group and a β-positional carbon atom under alkali conditions under which the hydroxyl group can dissociate, to obtain an arylcoumaran derivative containing an arylcoumaran unit in which a coumaran skeleton is bound to an aromatic ring of lignin.

15 Claims, 36 Drawing Sheets

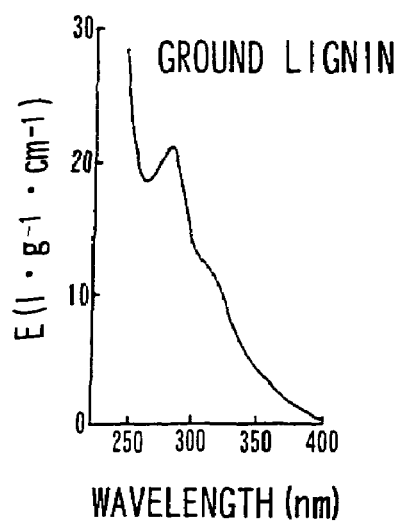
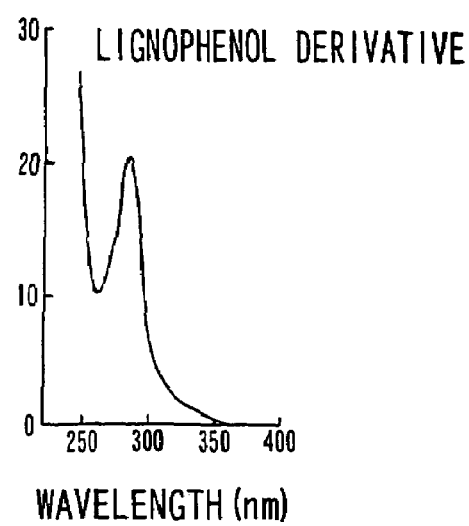
FIG.9 (a)          FIG.9 (b)
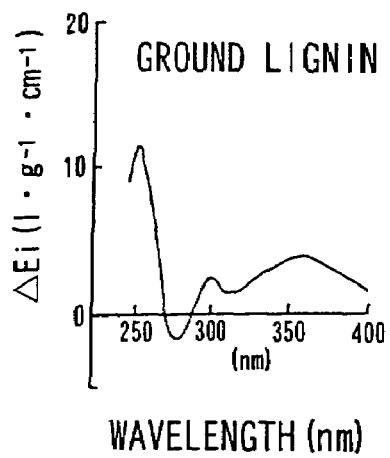
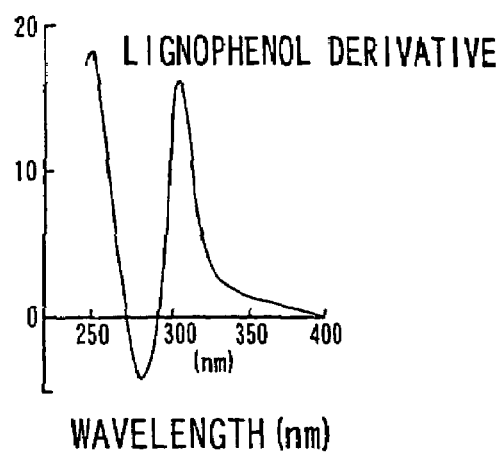
FIG.10 (a)         FIG.10 (b)

| SAMPLE | | YIELD (% of Klason lignin) |
|---|---|---|
| Yezo spruce | (*Picea jezoensis*) | 108.2 |
| Japanese fir | (*Abies firma*) | 111.8 |
| Japanese cedar | (*Cryptomeria japonica*) | 110.3 |
| Japanese birch | (*Betula platyphylla*) | 103.0 |
| Japanese oak | (*Quercus mongolica*) | 109.3 |
| Apitong | (*Dipterocarpus grandiflorus*) | 101.6 |

FIG.13

| SAMPLE | ELEMENTARY ANALYSIS RESULTS | | | INTRODUCED CRESOL | | APPEARANCE | DISSOLVING SOLVENT |
|---|---|---|---|---|---|---|---|
| | C | H | O | % | mol/C9 | | |
| GROUND LIGNIN | | | | | | | |
| Yezo spruce (*Picea jezoensis*) | 61.5 | 5.8 | 32.7 | | | | |
| LIGNOPHENOL DERIVATIVE | | | | | | | |
| Yezo spruce (*Picea jezoensis*) | 66.8 | 6.0 | 27.2 | 25.9 | 0.65 | | Methanol |
| Japanese fir (*Abies firma*) | 66.5 | 5.8 | 27.7 | 25.0 | 0.62 | Light pink | Ethanol |
| Japanese cedar (*Cryptomeria japonica*) | 66.2 | 5.9 | 27.9 | 24.8 | 0.62 | | Acetone |
| | | | | | | | Dioxane |
| Japanese birch (*Betula platyphylla*) | 59.7 | 6.1 | 34.2 | | | | THF |
| | | | | | | | Pyridine |
| | | | | | | | DMF |
| Japanese birch (*Betula platyphylla*) | 64.3 | 6.0 | 29.7 | 30.9 | 0.90 | | etc. |
| Japanese oak (*Quercus mongolica*) | 65.0 | 6.1 | 28.9 | 26.0 | 0.81 | Light pink | |
| Apitong (*Dipterocarpus grandiflorus*) | 67.9 | 6.1 | 26.0 | 33.2 | 0.92 | | |

FIG.14

| SAMPLE | HYDROXYL GROUP (mol/C9) | | |
|---|---|---|---|
| | $C_\alpha$ | $C_\gamma$ | Phenolic |
| GROUND LIGNIN | | | |
| Yezo spruce (*Picea jezoensis*) | 0.35 | 0.80 | 0.35 |
| LIGNOPHENOL DERIVATIVE | | | |
| Yezo spruce (*Picea jezoensis*) | Trace | 0.79 | 1.26 |
| Japanese fir (*Abies firma*) | Trace | 0.89 | 1.32 |
| Japanese cedar (*Cryptomeria japonica*) | Trace | 0.86 | 1.31 |
| GROUND LIGNIN | | | |
| Japanese birch (*Betula platyphylla*) | 0.53 | 0.82 | 0.32 |
| LIGNOPHENOL DERIVATIVE | | | |
| Japanese birch (*Betula platyphylla*) | Trace | 0.80 | 1.51 |
| Japanese oak (*Quercus mongolica*) | Trace | 0.88 | 1.51 |
| Apitong (*Dipterocarpus grandiflorus*) | Trace | 0.91 | 1.58 |

FIG.15

| SAMPLE | YIELD(%) | AVERAGE MOLECULAR WEIGHT | | | AMOUNT OF INTRODUCED CRESOL | |
|---|---|---|---|---|---|---|
| | | $\overline{Mw}$ | $\overline{Mn}$ | $\overline{Mw}/\overline{Mn}$ | Wt% | mol/C9 |
| LIGNOCRESOL | — | 8355 | 2737 | 3.053 | 26.70 | 0.68 |
| ARYLCOUMARAN COMPOUND | 81.07 | 1261 | 576 | 2.190 | 24.41 | 0.60 |

FIG.34

| SAMPLE | HYDROXYL GROUP (mol/C9) | | | | FREQUENCY OF PHENOLIC RINGS | |
|---|---|---|---|---|---|---|
| | Phenolic | | Aliphatic | | Guaiacyl (% of total guaiacyl) | Cresol (% of total cresol) |
| | Wt% | mol/C9 | Wt% | mol/C9 | | |
| LIGNOCRESOL | 9.94 | 1.60 | 6.21 | 1.00 | 46.04 | 81.14 |
| ARYLCOUMARAN COMPOUND | 9.75 | 1.51 | 7.68 | 1.19 | 67.09 | 67.83 |

FIG.35

| SAMPLE | YIELD (%) | AVERAGE MOLECULAR WEIGHT | | | AMOUNT OF INTRODUCED CRESOL | |
|---|---|---|---|---|---|---|
| | | $\overline{Mw}$ | $\overline{Mn}$ | $\overline{Mw}/\overline{Mn}$ | Wt% | mol/C9 |
| LIGNOCRESOL | — | 10691 | 3260 | 3.279 | 13.62 | 0.30 |
| LIGNIN CROSS-LINKING COMPOUND | 91.58 | 2894 | 919 | 3.149 | 13.76 | 0.30 |

FIG.36

| SAMPLE | HYDROXYL GROUP (mol/C9) | | | | HYDROXYMETHYL GROUP (mol/C9) | |
|---|---|---|---|---|---|---|
| | Phenolic | | Aliphatic | | | |
| | Wt% | mol/C9 | Wt% | mol/C9 | Wt% | mol/C9 |
| LIGNIN CROSS-LINKING COMPOUND | 7.75 | 1.06 | 10.55 | 1.44 | 6.90 | 0.56 |

FIG.37

| SAMPLE | SPECIFIC GRAVITY | WATER ABSORPTION *1 | VOLUMETRIC INCREASE *2 | |
|---|---|---|---|---|
| | | | AFTER WATER ABSORPTION | AFTER DRYING |
| CONTROL | 0.475 | 167.88 | 30.52 | 5.22 |
| LIGNOCRESOL | 0.557 | 15.69 | 7.43 | 1.01 |
| ARYLCOUMARAN COMPOUND | 0.559 | 15.64 | 9.36 | -0.51 |
| LIGNIN CROSS-LINKING COMPOUND | 0.596 | 9.34 | 6.55 | 0.77 |

*1 : % RELATIVE TO WEIGHT BEFORE WATER ABSORPTION
*2 : % RELATIVE TO VOLUME BEFORE WATER ABSORPTION

FIG.43

RECOVERY RATE OF A LIGNIN DERIVATIVE FROM A MOLDED PRODUCT
(% RELATIVE TO WEIGHT OF AN ATTACHED LIGNIN DERIVATIVE)

| SAMPLE | UNHEATED | HEATED |
|---|---|---|
| LIGNOCRESOL | 99.28 | 94.10 |
| ARYLCOUMARAN COMPOUND | 100.00 | 100.00 |
| LIGNIN CROSS-LINKING COMPOUND | — | Trace |

FIG.44

LIGNIN DERIVATIVES, MOLDED PRODUCTS USING THE SAME AND PROCESSES FOR MAKING THE SAME

CROSS-REFERENCE TO RELATED APPLICATIONS

This application is a divisional of U.S. patent application Ser. No. 10/619,930, filed Jul. 15, 2003 now issued as U.S. Pat. No. 6,841,660, which is a continuation of U.S. patent application Ser. No. 09/508,592, filed Jun. 5, 2000 now issued as U.S. Pat. No. 6,632,931, which claims the benefit of International Patent Application No. PCT/JP97/03240, filed Sep. 12, 1997, all of which are hereby incorporated by reference as if fully set forth herein in their entirety.

TECHNICAL FIELD

The present invention relates to a technical field of utilizing lignophenol derivatives obtained by phenol-derivatizing lignin, which are one component of timber. More particularly, the present invention relates to the technical field in which molded products are produced using novel materials obtained by further secondarily treating lignophenol derivatives with these materials and molding materials are recovered from the molded product for reuse.

BACKGROUND OF THE INVENTION

Recently, there has been increased an interest in forest resources that can be continuously used as industrial raw materials, instead of fossil resources, such as petroleum, coal and the like, which have been predicted to be depleted. Such a forest resource, i.e., a lignocellulose resource, is composed of hydrophilic carbohydrates, such as cellulose, hemicellulose and the like, and a hydrophobic lignin (polyphenol), which form the interpenetrating network (IPN) structure and an complicated complex in the cell wall. The lignocellulose resource imparts useful properties to various materials, because of the structure of the complex.

Two methods are known for utilizing the known lignocellulose resource, i.e. timber. One is a direct utilization of the lignocellulose material by cutting or machining the lignocellulose resource, i.e., the complex itself, and processing it into construction materials or furniture building materials having a predetermined shape, or processing the lignocellulose resource into chips or fibers for manufacturing molded products. The other is an indirect utilization of the lignocellulose material by extracting only cellulose, a component of the complex, and making a pulp of the product.

In view of the expected depletion of fossil resources in the future, the reuse of lignocellulose resources is important in the both utilization forms.

However, in the current situation, if a construction material is prepared according to the direct utilization method, it will have a predetermined shape and be comparatively large; therefore, treatments such as grinding and finely-dividing are usually necessary to reuse the construction material. In addition, thermosetting resins used in molded products are difficult to separate from wood chips and fibers. Therefore, in the direct utilization form, after the first use, a portion of the lignocellulose resource is discarded, in many cases without reuse.

Moreover, in the indirect utilization form, only cellulose is recovered and utilized to make a fiber or sheet.

Similarly, in the direct utilization form, the entire lignocellulose resource, i.e., cellulose and lignin, are not reused and, also in the indirect utilization form, lignin, which is one component of the lignocellulose resource, may be reused or not reused under in certain circumstances.

Lignin is an organic substance that exists in large amounts intermingled with cellulose. The present inventor considered the function of lignin as a complex constituting material and previously filed two applications that are directed to extraction of lignin from the lignocellulose resource in a functionalized form. The first application is Japanese Application No. 1-55686 (JP-A 2-233701) and the second application is Japanese Application No. 8-92695 (unpublished as of the filing date of this corresponding International application). The first application teaches methods of bonding a phenol derivative to the lignocellulose resource and, thereafter, contacting the lignocellulose resource with sulfuric acid, whereby lignin is separated from cellulose, because lignin has a bound phenol derivative. In addition, the second application teaches processes for manufacturing a novel cellulose-lignin molded product by using the hybrid lignin, which was provided in the first application, as a binder for a molded cellulose material.

DISCLOSURE OF THE INVENTION

Accordingly, an object of the present invention is to provide novel materials having improved functions that are formed by further secondarily-treating this hybrid lignin and to provide cellulose molded products utilizing these novel materials. In addition, another object is to provide methods for reusing the cellulose molded products by utilizing these novel materials.

In order to accomplish the aforementioned objects, the present inventor made the following inventions.

That is, a first invention is a novel process for producing a lignin derivative, which comprises using a lignophenol derivative containing a diphenylpropane unit formed by binding a carbon atom at an ortho-position relative to a phenolic hydroxyl group of a phenol derivative to a carbon atom at a benzyl-position of a phenylpropane fundamental unit of lignin, and binding an oxygen atom of the hydroxyl group to a β-positional carbon atom under alkali conditions, by which the hydroxyl group can dissociate, to obtain an arylcoumaran derivative containing an arylcoumaran unit in which a coumaran skeleton is bound to an aromatic ring of a phenylpropane unit of lignin. In this invention, the aforementioned phenol derivative is preferably p-cresol.

A second invention is a novel lignin derivative (hereinafter referred to as "an arylcoumaran derivative") represented by the following chemical formula and having an arylcoumaran unit in which a coumaran skeleton is bound to an aromatic ring of a lignin phenylpropane unit.

Chemical formula:

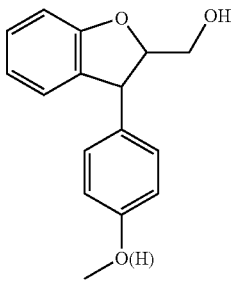

A third invention is a process for producing a novel lignin derivative, which comprises heating a lignophenol derivative containing a diphenylpropane unit formed by binding an aromatic carbon atom of a phenol derivative to a carbon atom at a benzyl-position of a phenylpropane fundamental unit of lignin, with a cross-linking functional group forming compound under alkali conditions, by which the introduced phenolic hydroxyl group of a phenol derivative and/or a phenolic hydroxyl group originally existing in lignin can dissociate, to introduce a cross-linking functional group at an ortho-position and/or a para-position of the phenolic hydroxyl group, thereby obtaining a lignin cross-linking derivative containing a diphenylpropane unit having a cross-linking functional group.

In this invention, preferably, the phenol derivative is p-cresol, the cross-linking functional group forming compound is formaldehyde and the cross-linking functional group is a hydroxymethyl group.

A fourth invention is a novel lignin derivative (hereinafter referred to as "a lignin cross-linking derivative") having a cross-linking functional group at an ortho-position and a para-position of a phenolic hydroxyl group of a lignophenol derivative containing a diphenylpropane unit formed by binding an aromatic carbon atom of a phenol derivative to a carbon atom at a benzyl-position of a phenylpropane fundamental unit of lignin. In this lignin derivative, a preferable cross-linking functional group is a hydroxymethyl group.

A fifth invention is molded products formed by molding fibrous, chip-like, or powdery substrate materials, characterized in that said molded products contain an arylcoumaran derivative.

This molded product has increased strength and water-resistance because of the connection of substrate molding materials using the arylcoumaran derivative. In addition, the arylcoumaran derivative can be easily extracted from a molded product using a solvent having affinity for the arylcoumaran derivative and can be separated from the molding material.

In this invention, the substrate molding material preferably is cellulose fiber, because cellulose fibers are readily available and are easily separated from the arylcoumaran derivative for reuse in a variety of ways.

A sixth invention is a molded product produced by molding fibrous, chip-like, or powdery substrate molding materials, characterized in that said molded product contains the aforementioned lignin cross-linking derivative.

This molded product has increased strength and water-resistance if molding substrate materials are bound by the lignin cross-linking derivative. Preferably, the lignin cross-linking derivatives are cross-linked, because cross-linking further increases strength and water-resistance.

A seventh invention is a method of treating a molded product, which comprises adding a solvent having affinity for this arylcoumaran derivative to a molded product containing the arylcoumaran derivative to recover the arylcoumaran derivative.

According to this invention, the arylcoumaran derivative is a binder material and can be reused and efficiently extracted and separated from a molded product. In addition, using this treatment, a molding substrate material can be reusably separated at the same time.

In this invention, the molding material preferably is cellulose fiber.

When the molding material is cellulose fiber, as a result of treatment with a solvent having affinity for a lignophenol derivative, the cellulose fiber is also readily separated.

Timber, waste timber, end timber, herbaceous plants, agricultural waste and the like can be used as the lignocellulose material and thus, lignocellulose materials are efficiently used and reused.

Further, in this invention, the molding material preferably is cellulose fiber obtained by splitting a lignocellulose material.

When the molding material is a cellulose fiber obtained by splitting a lignocellulose material, a novel molded product is formed using a lignocellulose material. Moreover, cellulose fiber is readily available and is easily separated from a lignophenol derivative, which is utilized again in a variety of ways. In particular, when a lignophenol derivative is obtained from a lignocellulose material, both the cellulose component and the lignin component are efficiently used.

BRIEF DESCRIPTION OF THE DRAWINGS

FIG. 9(a) shows a UV spectrum of ground lignin and FIG. 9(b) shows a UV spectrum of a lignophenol derivative.

FIG. 10(a) shows a differential spectrum of ground lignin and FIG. 10(b) shows a differential spectrum of a lignophenol derivative.

FIG. 13 is a diagram showing the yields of lignophenol derivatives from lignoceliulose materials of various origins.

FIG. 14 is a diagram showing elementary analysis results, an amount of introduced cresol, appearances, and a dissolving solvent for lignophenol derivatives obtained from lignocellulose materials of various origins.

FIG. 15 is a diagram showing the distribution of hydroxyl groups in lignophenol derivatives obtained from lignophenol materials of various origins.

FIG. 34 is a diagram showing the properties of a lignophenol derivative and an arylcoumaran derivative, which is a derivative thereof.

FIG. 35 is a diagram showing the distribution of hydroxyl groups and the phenolic frequency for a lignophenol derivative and an arylcoumaran derivative, which is a derivative thereof.

FIG. 36 is a diagram showing the properties of a lignophenol derivative and a lignin cross-linking derivative, which is a derivative thereof.

FIG. 37 is a diagram showing the distribution of hydroxyl groups and the phenolic frequency for a lignophenol derivative and a lignin cross-linking derivative, which is a derivative thereof.

FIG. 39(*b*) is a view showing MOE; FIG. 39(*c*) is a view showing MOR.

FIG. 43 is a diagram showing a comparison of water-absorption and volumetric change rates for molded cellulose products using a lignophenol derivative, an arylcoumaran derivative and a lignin cross-linking derivative, respectively.

FIG. 44 is a diagram showing recovery rates of various derivatives from a molded product.

BEST MODES FOR CARRYING OUT THE INVENTION

Modes for carrying out the present invention will be explained in detail below.

In the present invention, an arylcoumaran polymer and a cross-linking lignin derivative are produced from a lignocellulose material containing lignin. The lignocellulose material containing lignin refers to the woody part of a plant. More particularly, various trees such as coniferous trees, broadleaf trees, and various herbaceous plants, such as rice, corn, beet and the like, can be used as a raw material for the lignocellulose material. In addition, although the lignocellulose material can be used in any form such as powder, chips or the like, a powder lignocellulose material has advantages for efficiently extracting the lignophenol derivative. Moreover, the lignocellulose material may be a waste timber or an end timber of a lignocellulose material, or a feed or an agricultural waste containing a lignocellulose material may be used.

In order to produce an arylcoumaran derivative or a lignin cross-linking derivative from the lignocellulose material, a phenol derivative must first be bound to the lignin of the lignocellulose material to produce a lignophenol derivative from the lignocellulose material, in which a phenol derivative is introduced exclusively at an α-position (benzyl-position) of a sidechain of a phenylpropane unit, which forms the lignin skeleton (this step is referred to as a first derivatization step).

Figure 1:
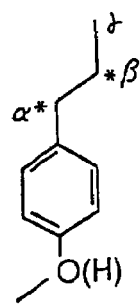
FIG. 1 is the structural formula showing a phenylpropane unit of lignin.

In the present specification, the phenylpropane unit in lignin refers to a unit, of which the fundamental skeleton is a structure of the 9 carbons shown in the structural formula of FIG. 1. In this structure, the symbol —O(H) shown bound to an aromatic ring means that, in some cases, a hydrogen atom is bound to the oxygen atom of the aromatic ring, thereby forming a hydroxyl group and in some case, this oxygen atom together with another phenylpropane unit constitutes an ether linkage.

Figure 2:
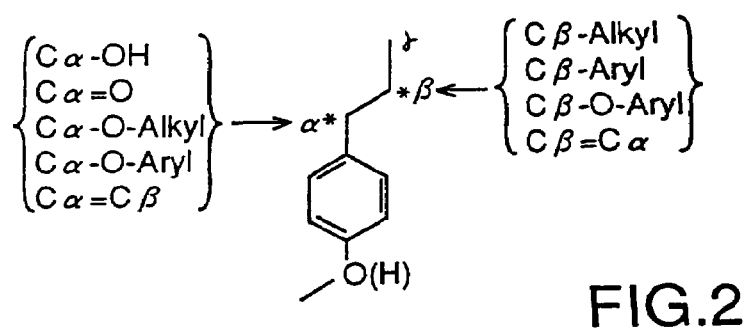
FIG. 2 is a view showing a structure that may be derivatized at an α-position and a β-position of the phenylpropane unit of lignin.
Figure 3:
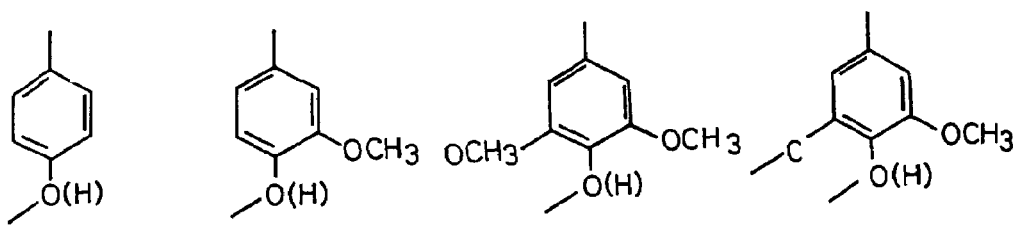
FIGS. 3(a) to 3(d) are views illustrating examples in which a sub-unit is derivatized at an aromatic ring of the phenylpropane unit of lignin.
Figure 4:
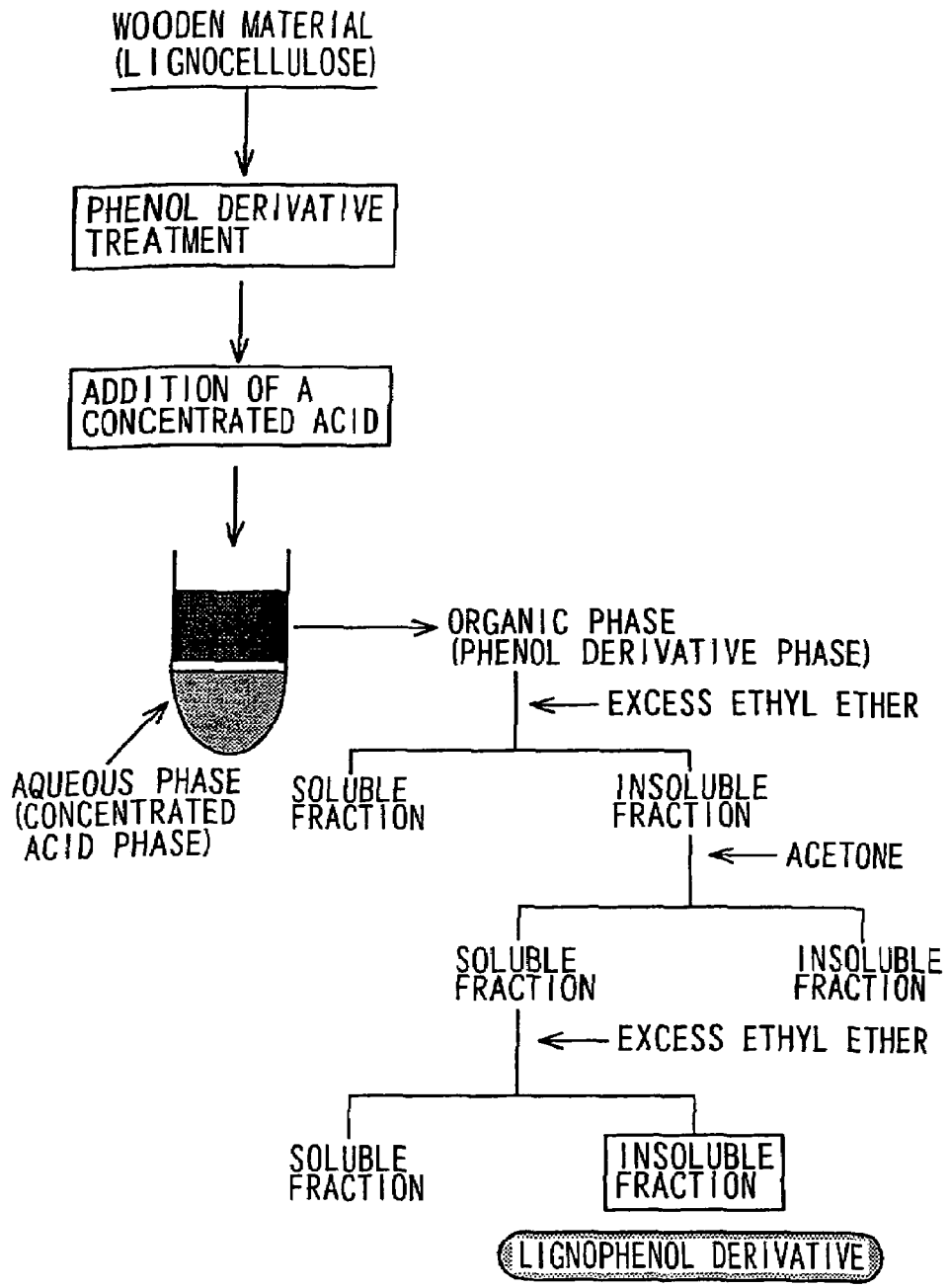
FIG. 4 is a view showing a first method for synthesizing a lignophenol derivative.

Within this phenylpropane unit is included an unit in which various structures shown in FIG. 2 are substituted at an α-position or a β-position of a sidechain of the fundamental unit of the aromatic ring. Also included is a unit in which an aromatic ring is bound to another substituent or another phenylpropane unit. Four examples are shown in FIGS. 3(*a*) to (*d*) as examples of various aromatic rings having other substituents. The other aromatic rings include one or two methoxyl groups bound to an ortho-position relative to a phenolic or ethereal hydroxyl group, or one methoxyl group is bound to one or ortho-position and a carbon atom, which binds to the other fundamental unit that is bound to the other ortho-position.

Hereinafter, in the present specification and drawings, the aromatic rings derived from a phenylpropane unit of lignin, which are described in the specification and in the drawings, are intended to include all such variations.

In the present invention, a material having more functional features is formed by introducing the predetermined phenol derivative at this α-position to decrease the structural irregularity of lignin and further secondarily-derivatized the resulting lignophenol derivative.

Currently, there are two methods for extracting lignin in a lignocellulose material as a lignophenol derivative. In this example, lignophenol derivative means a polymer containing a diphenylpropane unit in which a phenol derivative is introduced at an α-position of a sidechain of a phenylpropane unit of lignin via a C—C linkage. The amount and molecular weight of the introduced phenol derivative in this polymer varies depending upon the lignocellulose material used as a raw material and the reaction conditions.

The first method is a method described in the first application noted above (JP-A 2-233701).

Figure 6:
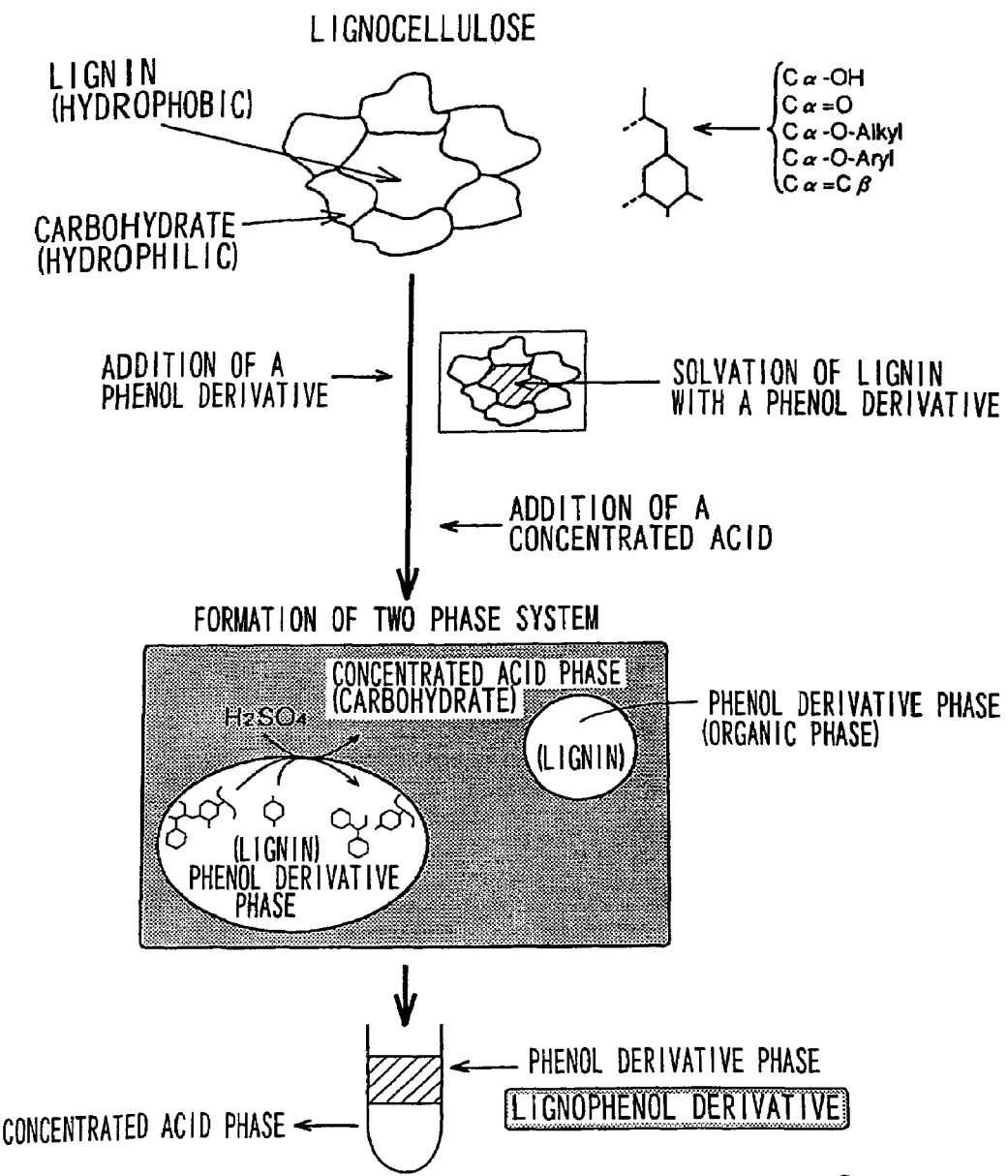
FIG. 6 is a view showing the reaction of lignin with a phenol derivative using concentrated sulfuric acid at an interface of a phenol derivative phase in a two phase phenol derivative/concentrated sulfuric acid solution.

In this method, for example, a lignocellulose material, such as wood powder or the like, is mixed with a liquid phenol derivative (such as cresol or the like) to dissolve the lignin in the phenol derivative. Then, concentrated sulfuric acid (for example, 72% sulfuric acid) is added to the lignocellulose material to mix and to dissolve the cellulose component. According to this method, the phenol derivative containing the dissolved lignin and the concentrated sulfuric acid containing the dissolved cellulose component form a two phase solution. Lignin dissolved in the phenol derivative only contacts the acid at an interface in which the phenol derivative phase contacts the concentrated acid phase. As a result, a cation at a sidechain α-position (benzyl-position), which is a highly reactive site of a lignin fundamental constituent unit and is produced by contact with the acid, binds to the phenol derivative. As a result, the phenol derivative is introduced at the α-position via a C—C linkage. In addition, a benzyl aryl ether linkage is made into low molecular species by cleavage. As a result, lignin is made into low molecular species and a lignophenol derivative, in which a phenol derivative is introduced at a benzyl-position of a fundamental constituent unit thereof, is produced in the phenol derivative phase (see FIG. 6). The lignophenol derivative is then extracted from this phenol derivative phase. The lignophenol derivative is obtained as a part of an aggregate of low molecular weight lignin that has been made into a low molecular species by cleavage of the benzyl aryl ether linkage in the lignin. Methods for introducing a phenol derivative at a benzyl-position via a phenolic hydroxyl group are known.

Extraction of the lignophenol derivative from the phenol derivative phase can be performed, for example, according to the following method. That is, the phenol derivative phase is added to a large excess of ethyl ether to obtain precipitates that are collected and dissolved in acetone. Acetone insoluble products are removed by centrifugation and the acetone-soluble products are concentrated. The acetone-soluble products are added dropwise to a large excess of ethyl ether and the precipitate fractions are collected. The solvent is distilled off from the precipitate fractions and the precipitate fractions are dried in a desiccator with phosphorus pentaoxide to obtain a low-molecular weight crude lignophenol derivative containing the lignophenol derivative as a dried portion. In addition, the crude lignophenol derivative can be also obtained by removing the phenol derivative phase by simple distillation under reduced pressure. Moreover, the acetone-soluble products can be used as such as a lignophenol derivative solution in the secondarily-derivatized treatment.

Figure 5:
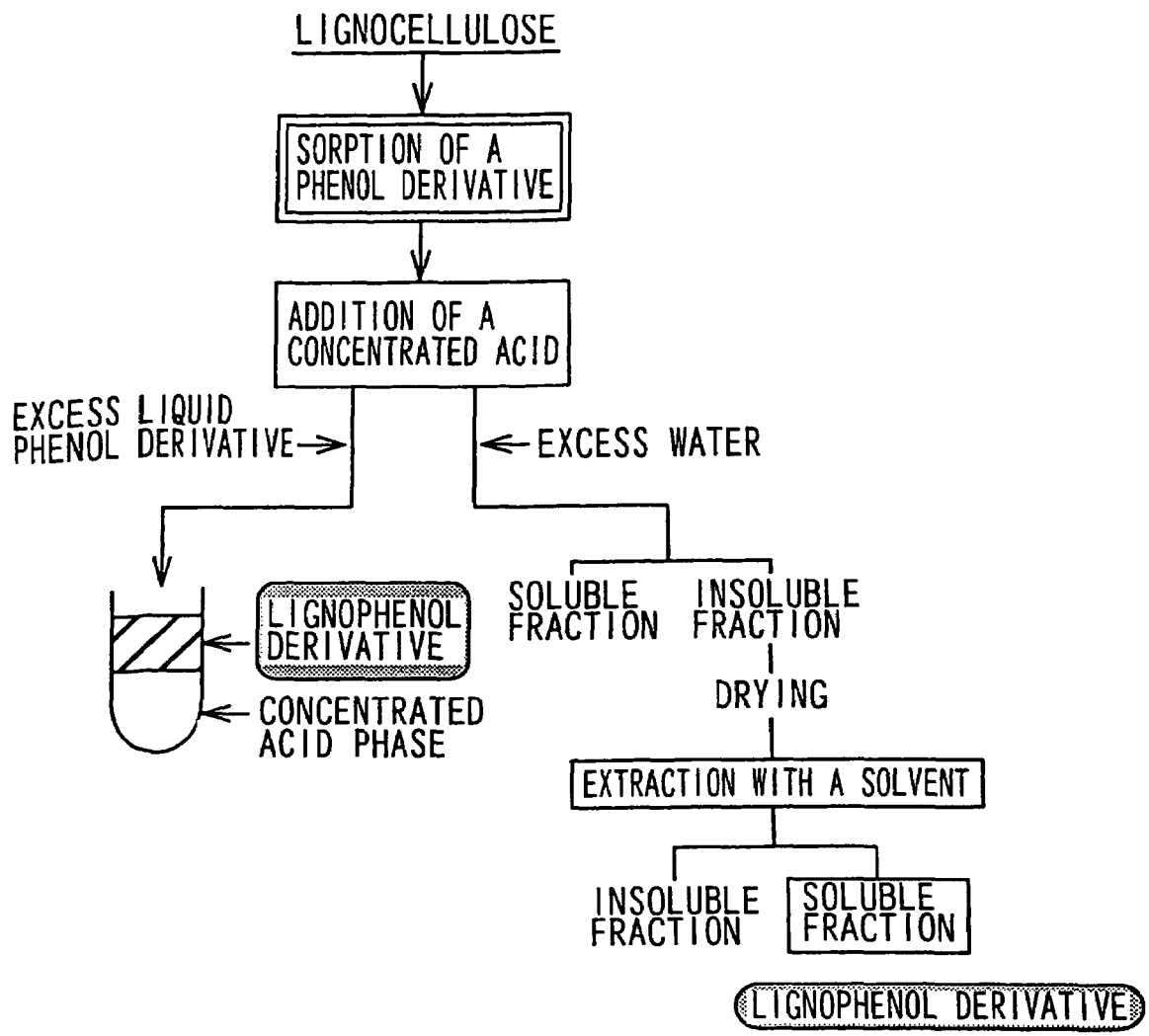
FIG. 5 is a view showing a second method for synthesizing a lignophenol derivative.

In a second method, after a lignocellulose material is mixed with a solvent (for example, ethanol or acetone), which dissolves a solid or liquid phenol derivative, the solvent is distilled off as shown in FIG. 5 (phenol derivative sorbing step). Next, a concentrated acid is added to this lignocellulose material to dissolve the cellulose component. As a result, similar the first method, for lignin dissolved with the phenol derivative, a cation at a highly reactive site (sidechain α-position) of lignin that was produced by contact with the concentrated acid binds to the phenol derivative and the phenol derivative is introduced therein. In addition, lignin is made into low molecular weight species by cleavage of the benzyl aryl ether linkage. The properties of the resulting lignophenol derivative are not different from those obtained by the first method. Then, the lignophenol derivative is extracted by a liquid phenol derivative. Extraction of the lignophenol derivative from the liquid phenol derivative phase can be performed in the same manner as that of the first method. Alternatively, the whole reaction solution, after treatment with a concentrated acid, is placed into an excess of water and the insoluble fractions are collected, dialyzed and dried. Acetone or alcohol is added to this dried material and the lignophenol derivative is extracted. In addition, similar to the first method, this soluble fraction is added dropwise to an excess of ethyl ether or the like and the lignophenol derivative is obtained as an insoluble fraction.

Also in this method, similarly, an acetone-soluble product can be used as a lignophenol derivative solution for the secondarily-derivatizing treatment.

Of these two kinds of methods, the second method, which is a method for extracting and separating a lignophenol derivative with acetone or alcohol, is economical, because less phenol derivative is used. In addition, because this method can treat a large amount of lignocellulose material with a lessor amount of a phenol derivative, it is suitable for large scale synthesis of lignocellulose derivatives.

Figure 7:
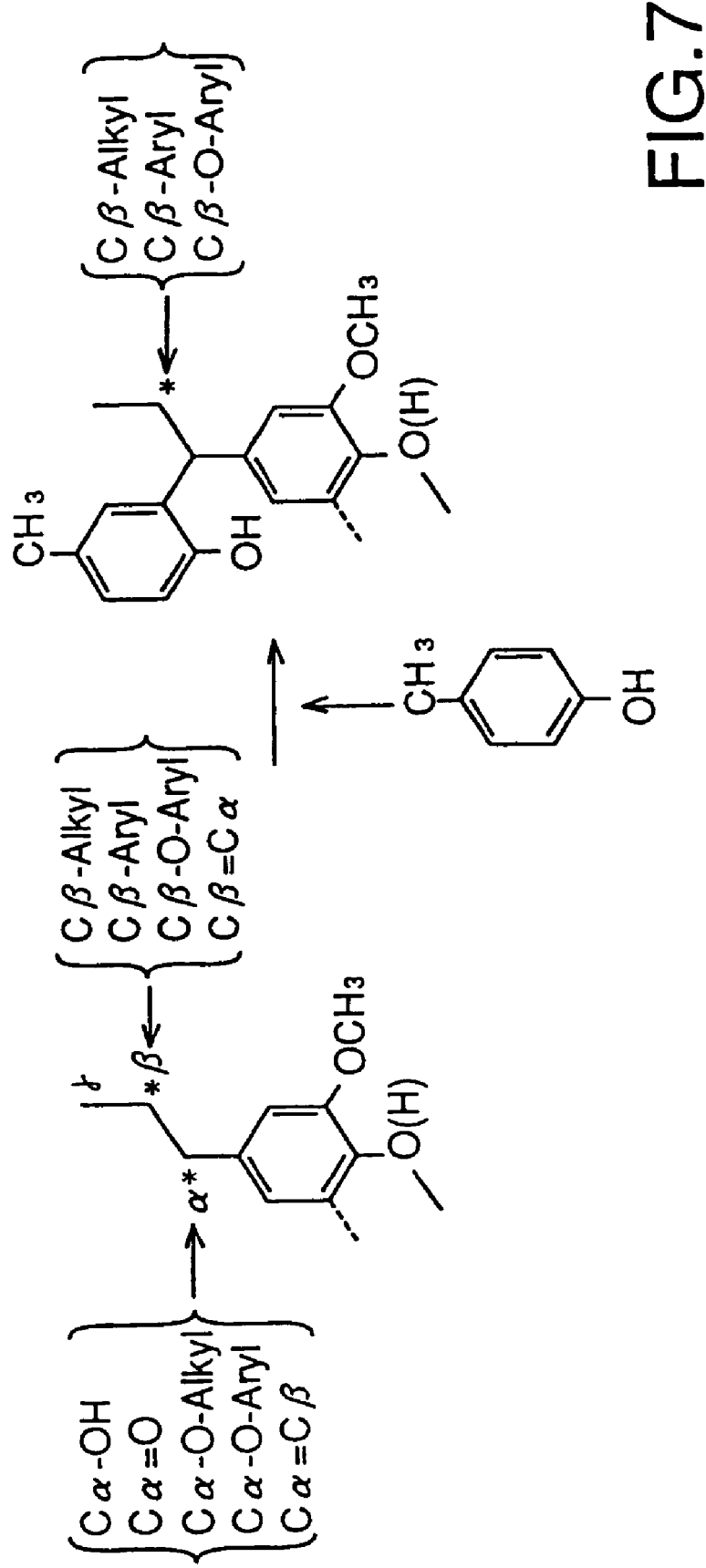
FIG. 7 is a view showing a schematic in which a phenol derivative is selectively introduced at an o-position of a lignin sidechain.

FIG. 7 shows a schematic in which a phenol derivative is selectively introduced at an α-position of the lignin sidechain by these methods. Introduction of the phenol derivative at a phenylpropane unit of lignin and the amount that is introduced can be confirmed by $^1$H-NMR. Selective introduction at an α-position of a sidechain of a phenylpropane unit also can be confirmed by $^1$H-NMR and nucleus-exchange analysis.

Figure 8:
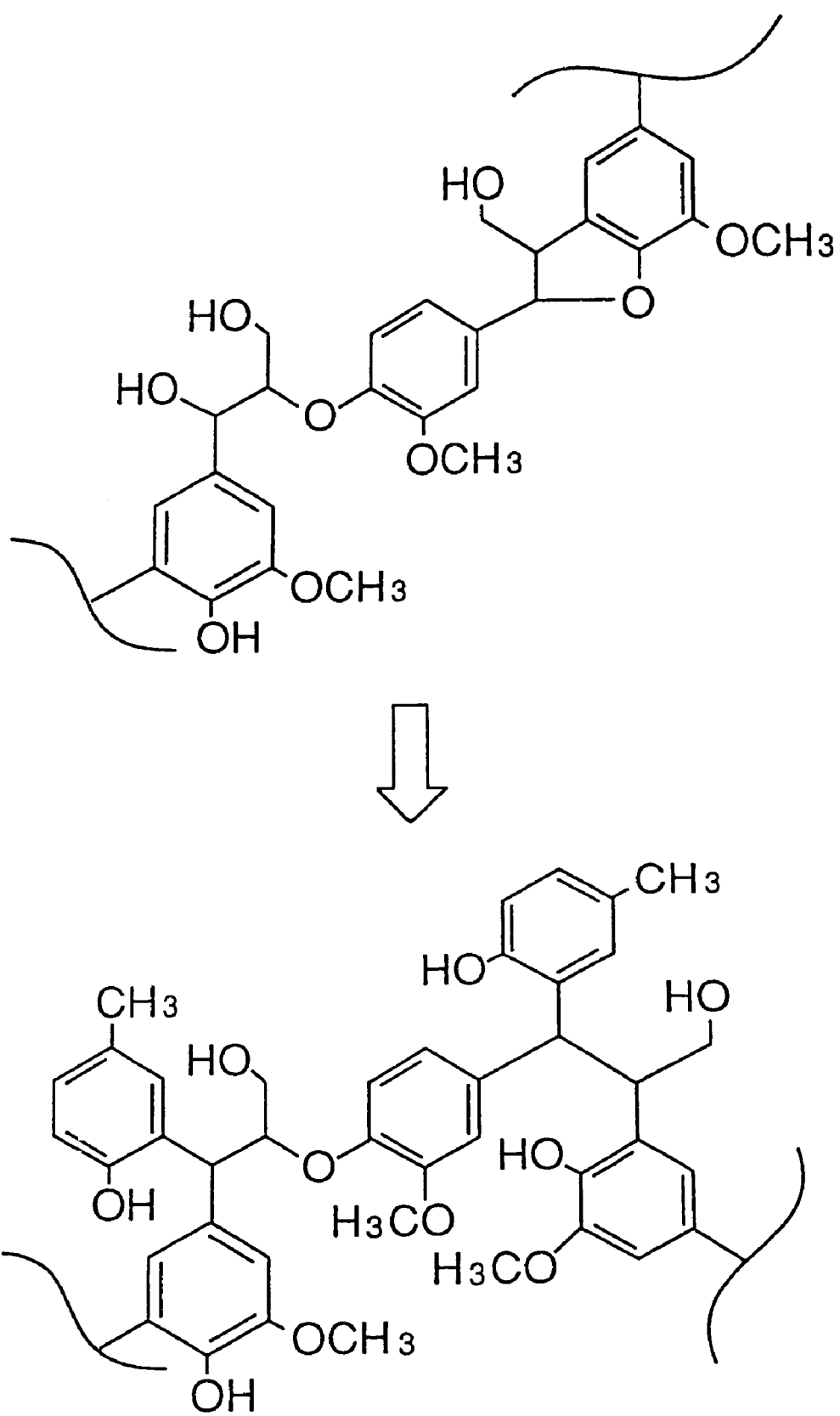
FIG. 8 is a view showing a partial structure of lignin that has undergone structural conversion by introduction of a phenol derivative at an α-position of a lignin sidechain.

Moreover, in FIG. 8, a step for converting natural lignin into a lignophenol derivative by these methods is represented by showing a change in a partial structure of the lignophenol derivative.

In addition, FIGS. 9(*a*) and 9(*b*) show a UV spectrum of a sample of milled wood lignin (hereinafter referred to as "ground lignin") obtained from defatted wood powder by a Bjorkman method and a lignophenol derivative (lignocresol) sample in the case in which cresol was introduced as the phenol derivative into the lignocellulose material. FIGS. 10(*a*) and 10(*b*) show an ionization differential spectrum (ΔEi spectrum) of the respective samples of FIGS. 9(*a*) and 9(*b*). In FIGS. 9(*a*) and (*b*) and FIGS. 10(*a*) and (*b*), the lignophenol derivative shows a very sharp peak at 280 nm and 300 nm, respectively. Moreover, a shoulder peak that was observed at the longer wavelength side in the previous lignin samples was not seen at all in a lignocellulose derivative. This result shows that little complicated secondary structural change, such as generation of a conjugated system other than the selective phenolization at the sidechain α-position in the lignin phenylpropane unit, is produced in the first derivatized step and that, accordingly, the conjugated system disappears and the structural diversity is diminished. The lignocresol used was obtained by mixing 10 ml of p-cresol with 20 ml of 72% sulfuric acid per 1 g of wood powder and stirring at 25° C. for 60 minutes according to the aforementioned first method. After measurement of the UV spectrum, the sample was dissolved in methyl cellulose. After measurement of the ΔEi spectrum, measurements were performed using methyl cellulose and 1N sodium hydroxide solution.

Figure 11:
FIG. 11(a) is an IR spectrum of ground lignin.
FIG. 11(b) is an IR spectrum of a lignin sulfate.
FIG. 11(c) is an IR spectrum of a lignophenol derivative.
Figure 11:
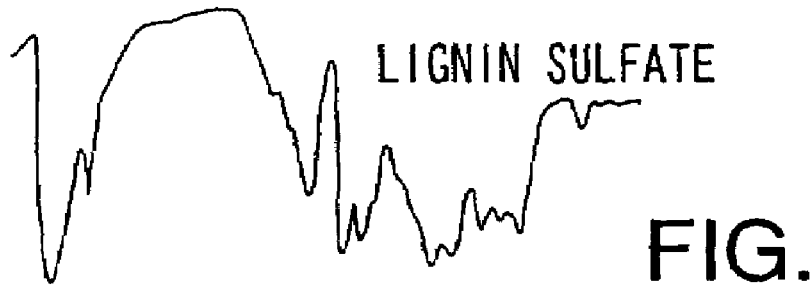
Figure 11C:
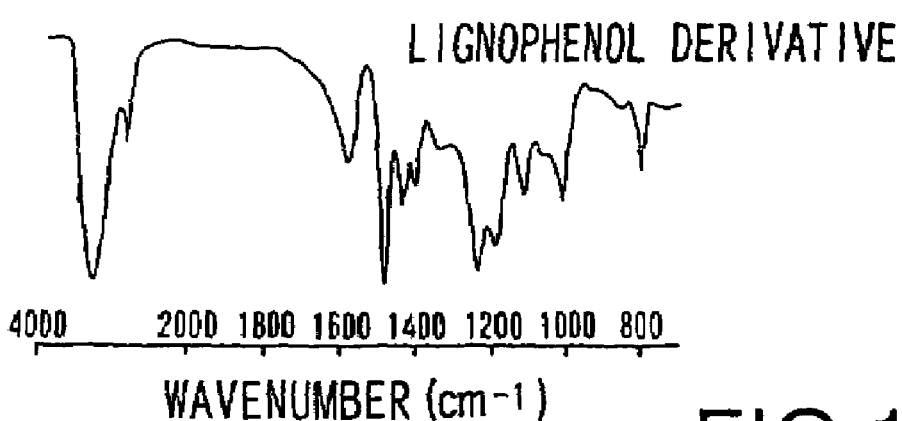

FIGS. 11(a) to 11(c) show an IR spectrum (KBr method) of a ground lignin sample, a lignin sulfate sample (FIG. 11(a)) prepared from defatted wood powder using a Tappi method, and the lignophenol derivative (lignocresol) (FIG. 11(b)) used in FIG. 9(b). IR spectrum of the lignophenol derivative has a very sharp absorption as compared with lignin sulfate prepared using only 72% sulfuric acid and it demonstrates that auto-condensation, which would make the molecule rigid, is not generated. In addition, little absorption is apparent near 1650 $cm^{-1}$, which would be attributable to a conjugated carbonyl group. Conversely, a strong absorption based on the adjacent 2H of a phenol ring is apparent near 800 $cm^{-1}$. This result is more consistent with that of the UV spectrum.

Figure 12:
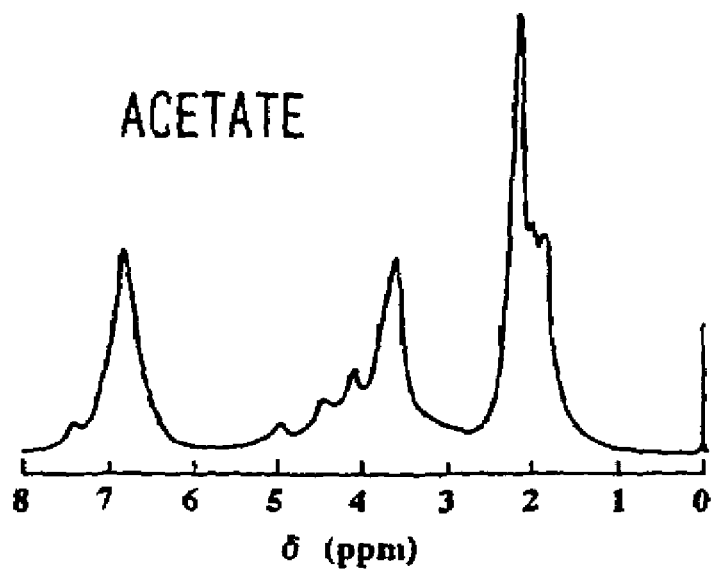
FIG. 12(a) is an $^1$H-NMR spectrum of an acetate compound of a lignophenol derivative and FIG. 12(b) is an $^1$H-NMR spectrum of an acetate compound of ground lignin.
Figure 12:
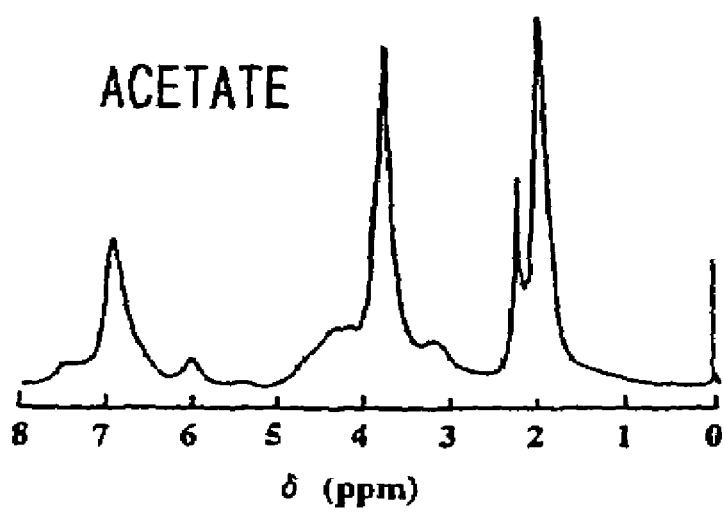

FIGS. 12(a) and 12(b) show an $^1$H-NMR spectrum of the lignophenol derivative (lignocresol) used in FIGS. 9(a) and 9(b), the acetate thereof (FIG. 12(a)), and the acetate of a ground lignin sample (FIG. 12(b)). Although the acetoxy proton area (1.6-2.5 ppm) overlaps with a methyl proton of the introduced cresol, it is clear that, from the signal pattern, the lignophenol derivative has many phenolic hydroxyl groups and still retains an aliphatic hydroxyl group. In addition, a methoxyl proton and an aliphatic sidechain proton (2.50-5.20 ppm) are clearly apparent and thus, it is believed that the irregularities of the natural lignin have been reduced. In addition, from the integrated values of the various peaks in these spectra, the amount of the aliphatic hydroxyl group and the aromatic hydroxyl group can be quantified and the amount of introduced phenol derivative (p-cresol in this spectrum) can be also quantified.

FIG. 13 shows the yields of lignophenol derivatives obtained by introducing p-cresol as a phenol derivative into lignocellulose materials (wood powder) of various origins (expressed as weight % relative to the lignin contained in wood powder and the yield includes introduced cresol). Little difference in the separating properties are observed among tree species for both coniferous trees and broadleaf trees. In addition, these lignophenol derivatives are obtained by using 10 ml of p-cresol and 20 ml of 72% sulfuric acid per 1 g of wood powder according to the aforementioned first method.

FIG. 14 shows the properties (elementary analysis results, the amount of introduced cresol, appearances and dissolving solvent) of various lignocresol samples produced by introducing cresol into lignocellulose materials (wood powder) of various origins (those obtained under the same conditions as those for the lignocellulose material of FIG. 10). As compared with the ground lignin sample, which is believed to have little structural change in the isolating step, the lignophenol derivative has 5% higher carbon content and 5% lower oxygen content based on cresol binding for both coniferous trees and broadleaf trees. Introduced cresol is about 25% (about 0.65 mol/C9) in coniferous trees and about 30% (about 0.9 mol/C9) in broadleaf trees and it has been proved that more than 90% of the binding positions are the sidechain α-position. In addition, the weight-average molecular weight is 3000-4000 in the lignophenol derivative derived from coniferous trees and is slightly lower in broadleaf trees. Further, the lignophenol derivative rapidly dissolves in various solvents, such as methanol, ethanol, acetone and the like.

In addition, the lignophenol derivative had a slightly pinkish-white appearance, even though it was treated with a concentrated acid and a large amount of cresol was introduced. This is greatly different from the lignin phenolized with a sulfuric acid or hydrochloric acid catalyst, which had a black color.

FIG. 15 shows the amount of hydroxyl group in lignophenol derivatives (lignocresol) obtained from various origins using the same conditions as those for the samples in FIGS. 10(a) and 10(b). The lignophenol derivative does not have a benzyl hydroxyl group at a sidechain α-position and on the other hand, the sidechain γ-positional hydroxyl group is retained in the same amount as that of a ground lignin. Phenolic hydroxyl groups are greatly increased as a result of cleavage of the benzyl aryl ether in lignin and introduction of cresol in the treating process.

(Lignophenol Derivative as a Starting Material for Synthesizing an Arylcoumaran Polymer)

Figure 16:
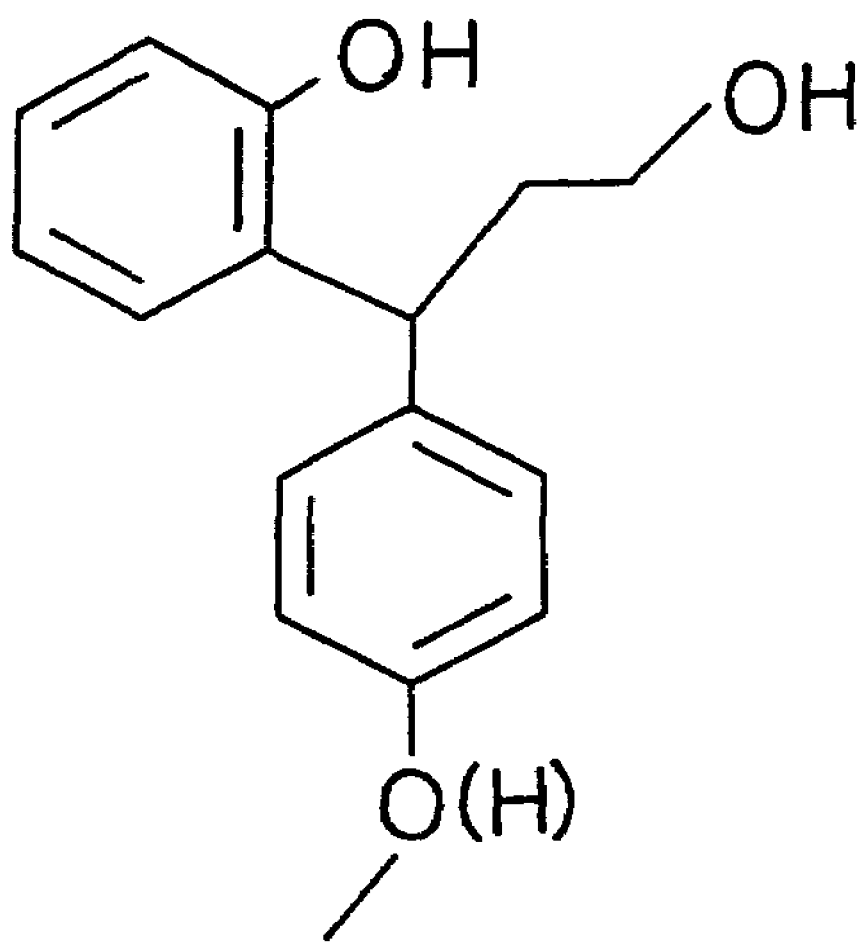
FIG. 16 is a view showing a sub-unit of a lignophenol derivative that is used to synthesize an arylcoumaran derivative.

A lignophenol derivative, which is used for synthesizing an arylcoumaran polymer of the present invention, requires that the carbon at an ortho-position relative to a phenolic hydroxyl group of introduced phenol derivative is bound to a sidechain α-positional carbon of a phenylpropane unit of lignin. That is, the fundamental structure shown in FIG. 16 is required. In FIG. 16, the aromatic ring of the introduced phenol has no substituents other than hydrogen. However, in the present invention, the introduced phenol ring of the lignophenol derivative is not intended to be limited to such a structure and it may have other substituents. In the present specification, claims and drawings, the phenol derivative that is introduced into a phenylpropane unit is described and expressed in drawings is intended to include phenol derivatives having various substituents.

Because the phenolic hydroxyl group of such introduced phenols dissociates under alkali conditions and an arylcoumaran structure is formed by rearrangement with the adjacent groups, the phenol derivative for synthesizing a lignophenol derivative, which is then used to synthesize an arylcoumaran polymer of the present invention, simply requires that at least one ortho-position relative to one phenolic hydroxyl group is free, that is, there is no substituent at that position, because this ortho-position will become a site for binding to the main lignin structure. More particularly, monovalent phenol derivatives, such as phenol, alkylphenols, such as cresol and the like, methoxyphenol, naphthol and the like, divalent phenol derivatives, such as catechol, resorcinol and the like, and trivalent phenol derivatives, such as pyrogallol and the like, are appropriate, because these derivatives do not have any substituents at an ortho-position relative to a phenolic hydroxyl group.

Confirmation of the formation of such lignophenol derivatives can be confirmed by $^1$H-NMR and nucleus exchange analysis.

(Lignophenol Derivative as a Starting Material for Synthesizing a Cross-linking Lignin Derivative)

The lignophenol derivatives, which can be used to synthesize a cross-linking lignin derivative of the present invention, are not particularly limited. In the present invention, a cross-linking functional group is introduced into a site that is an ortho-position or para-position relative to the phenolic hydroxyl group, which introduction ite inherently exists in the phenylpropane unit of lignin, because when the cross-linking functional group is introduced into any site of a diphenylpropane unit of a lignophenol derivative, a cross-linking lignin derivative is formed.

Increase in an introduced amount and adjustment of an introduced amount by introducing a cross-linking functional group also on the introduced phenol derivative side can be accomplished by selecting the phenol derivative to be introduced.

That is, because the cross-linking functional group is introduced at the ortho-position or para position relative to the phenolic hydroxyl group under alkaline conditions by which a phenolic hydroxyl group dissociates, when at least one of the ortho-position or the para-position relative to the phenolic hydroxyl group of the introduced phenol is free in a lignophenol derivative, the cross-linking functional group also will be introduced at the introduced phenol derivative side.

In order to produce the lignophenol derivative of the present invention, because the sidechain α-positional carbon of the lignin phenylpropane unit and the carbon that is ortho-position or para-position relative to phenol derivative phenolic hydroxyl group are bound together, in order to obtain a cross-linking lignin derivative when at least two sites of two positions and one para-position relative to one phenolic hydroxyl group are free, one site becomes a site for binding to the phenylpropane unit and thereafter, another cross-linking functional group introducing site can remain.

Conversely, if a lignophenol derivative in which a phenol derivative having substituents at two or more sites among an ortho-position and a para-position relative to the phenolic hydroxyl group is used, such as 2,4-xylenol, 2,6-xylenol and the like, because a cross-linking functional group introducing site is no longer present in the introduced phenyl derivative, only the cross-linking functional group will be introduced into the main lignin structure.

Therefore, by combining a phenol derivative having a cross-linking functional group introducing site and a different reactivity with a phenol derivative having no or a different introducing site number, or combining two or more of them, the number of sites for introducing a cross-lining functional group in a lignophenol derivative can be controlled and as a result, the cross-linking degree of the cross-linking lignin derivative can be controlled.

Preferred phenol derivatives, which can also introduce a cross-linking functional group at an introduced phenol derivative side, are phenol and cresol (particularly, m-cresol). In addition, preferred phenol derivatives, which do not introduce a cross-linking functional group into the introduced phenol derivative, are 2,4-xylenol and 2,6-xylenol.

(Preparation of an Arylcoumaran Derivative)

In order to obtain an arylcoumaran derivative from a lignophenol derivative, a lignophenol derivative having a carbon in an ortho position relative to the phenolic hydroxyl group of the aforementioned predetermined lignophenol derivative, i.e. a phenol derivative is bound to the carbon at a sidechain α-position of the main lignin structure, is treated under alkali conditions.

This alkali treatment step dissociates a phenolic hydroxyl group of the phenol derivative that was introduced at the sidechain α-position, forming a bond with the sidechain β-positional carbon and at the same time, cleaves the β-aryl ether linkage. By this treatment, a coumaran structure represented by the structural formula below can be formed at the sidechain α-position. This treatment leads to etherification of the phenolic hydroxyl group of the introduced phenol derivative by formation of a bond between the phenolic hydroxyl group and the carbon of the introduced phenol derivative, and the appearance of a new phenolic hydroxyl group at a benzene ring of a main lignin structure. As a result, this alkali treatment also transfers a phenolic hydroxyl group (phenol activity) from an α-position-introduced phenol derivative to the main lignin structure.

More particularly, this alkali treatment is performed by dissolving a lignophenol derivative in an alkali solution, permitting the reaction to proceed for a period of time and, if needed, heating.

Alkali solutions used in this treatment may be any alkali solution as long as it can dissociate the phenolic hydroxyl group of the introduced phenol derivative in the lignophenol derivative, and the type and concentration of alkali conditions or the type of solvents and the like are not limited, because when the aforementioned dissociation of the phenolic hydroxyl group occurs under alkali conditions, a coumaran structure is formed by the adjacent groups.

For example, in the case of a lignophenol derivative in which p-cresol is introduced, an aqueous NaOH solution can be used. If treatment is performed at an alkali concentration of 0.5 to 2N for 2 hours, it has been confirmed that the degree of low-molecular species and the formation of arylcoumaran derivatives from the lignophenol derivative are slightly different depending upon the concentration of the alkali solution.

In addition, the lignophenol derivative will readily rearrange under alkali conditions and heating to form a coumaran structure. Conditions such as a temperature, pressure and the like when the heating is started can be set without particular limitation in a range for which the formation of an arylcoumaran derivative is not promoted. For example, an arylcoumaran derivative can be efficiently obtained by heating an alkali solution to a temperature of not lower than 100° C. In addition, an arylcoumaran derivative may be obtained more efficiently by heating an alkali solution to a temperature not lower than the boiling point thereof under pressure.

It has been proved that, if the heating temperature is increased, the production of low-molecular species by cleavage of the β-aryl ether linkage is promoted in the heating temperature range of 120° C. to 140° C. for identical alkali solutions and concentrations. In addition, it has been also proved that, as the heating temperature is increased, phenolic hydroxyl groups derived from an aromatic ring derived from the main lignin structure are increased and phenolic hydroxyl groups derived from an introduced phenol derivative are decreased, in the aforementioned temperature range. Therefore, the degree of low molecular species formation and the degree of transference of a phenolic hydroxyl group site from an α-position-introduced phenol derivative side to a phenol ring of the main lignin structure can be adjusted by the reaction temperature. That is, in order to promote low molecular species formation and obtain an arylcoumaran derivative in which more phenolic hydroxyl group sites are transferred from an α-position-introduced phenol derivative side to the main lignin structure, a higher reaction temperature is preferable. The heating temperature is preferably not lower than 80° C. and not higher than 160° C. When the temperature is much lower than 80° C., the reaction does not proceed sufficiently and, when the temperature significantly exceeds 160° C., non-preferable reactions result. More preferably, the temperature is not lower than 100° C. and not higher than 140° C. In addition, heating is preferably performed under pressure.

One example of such a treatment utilizes conditions under which an aqueous 0.5N NaOH solution is used as the alkali solution and the treatment is performed at 140° C. for 60 minutes in an autoclave. In particular, these treatment conditions are preferably used for lignophenol derivatives that are derivatized with p-cresol.

In low molecular species formation treatment of a ligno-hybrid derivative in the alkali solution, for example, the reaction is stopped by cooling or the like, the pH is lowered to around 2 using a suitable acid, such as 1N hydrochloric acid or the like, to regenerate the phenolic hydroxyl group (as an OH group), and the resulting precipitates are centrifuged, washed under neutral conditions and after lyophilization, further dried over phosphorus pentaoxide. As a result, an arylcoumaran derivative, i.e., a lignin-derived derivative having a coumaran skeleton, can be obtained.

Figure 17:
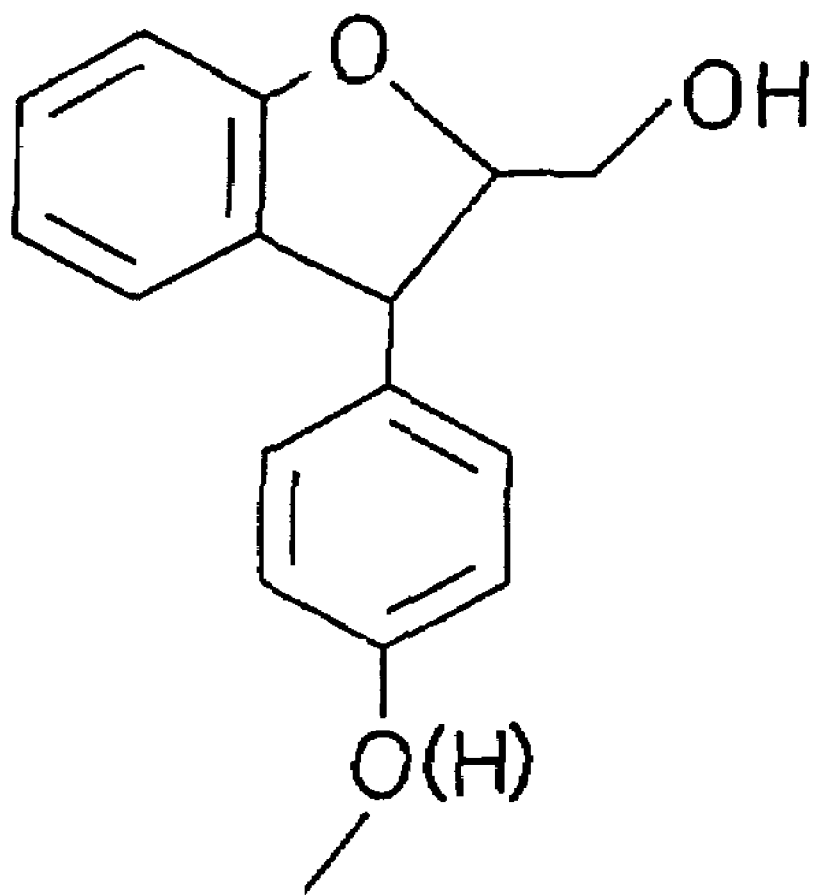
FIG. 17 is a view showing an arylcoumaran unit.

An arylcoumaran derivative is a lignin derivative containing a structure (an arylcoumaran unit) in which a phenol ring is introduced at a sidechain α-positional carbon atom of an aromatic ring of a phenylpropane unit of lignin together with the phenylpropane unit and forms a coumaran skeleton as shown in FIG. 17. The weight-average molecular weight is preferably 500 to 2000. In addition, an arylcoumaran derivative having an arylcoumaran unit of 0.3 to 0.5 mol/C9 (fundamental unit) is preferable. An arylcoumaran derivative means both a monomer consisting of such an arylcoumaran unit and a polymer partially having a fundamental unit having an arylcoumaran unit (at least at an end part), including an arylcoumaran derivative that is a mixture of the monomer and the polymer. An arylcoumaran derivative may contain simple low-molecular species compounds derived via the cleavages of the benzyl aryl ether bond and β-aryl ether bond of lignophenols in the step for preparing this arylcoumaran derivative. Usually, the arylcoumaran derivative is obtained in a mixed state in which the mixture contains such low-molecularized compounds in addition to a monomer and a polymer in the alkali solution.

Figure 18:
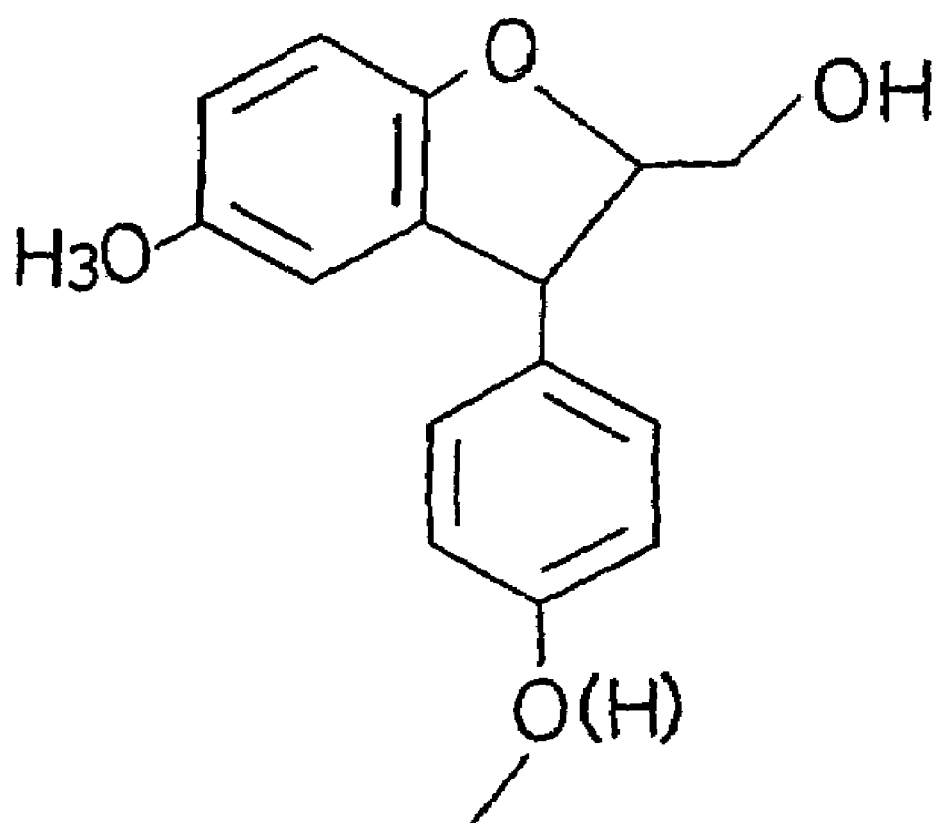
FIG. 18 is a view showing one example of an arylcoumaran unit obtained from a lignophenol derivative obtained by using p-cresol as a phenol derivative.

FIG. 18 shows one example of an arylcoumaran unit obtained from a lignophenol derivative using p-cresol as a phenol derivative.

(Structure of an Arylcoumaran Derivative)

The percentage of the coumaran skeleton and the phenolic aromatic ring in the thus obtained arylcoumaran derivative, the amount of introduced cresol, the amount of a hydroxyl group and the entire structure can be confirmed by a nucleus exchange method, $^1$H-NMR or the like.

Figure 19:
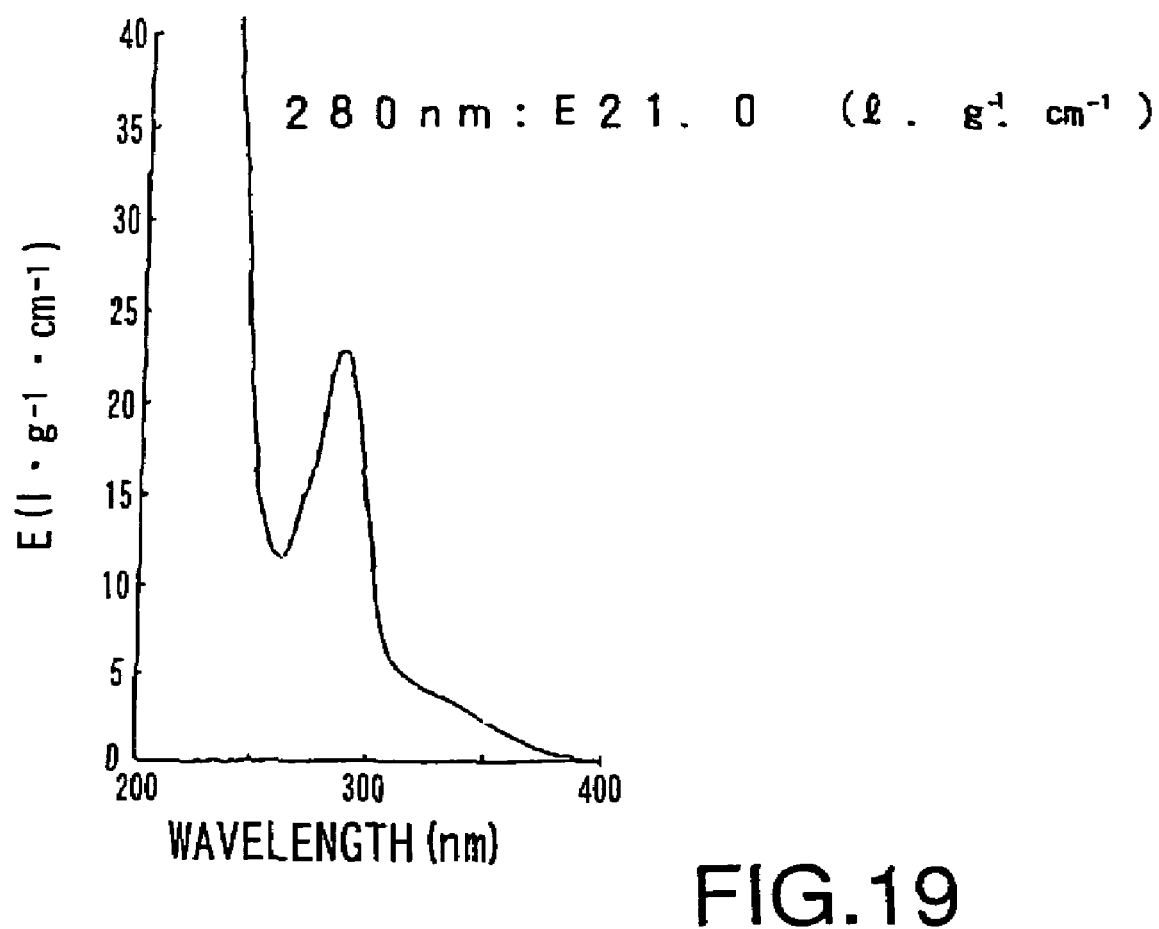
FIG. 19 is one example of a UV spectrum of an arylcoumaran derivative.
Figure 20:
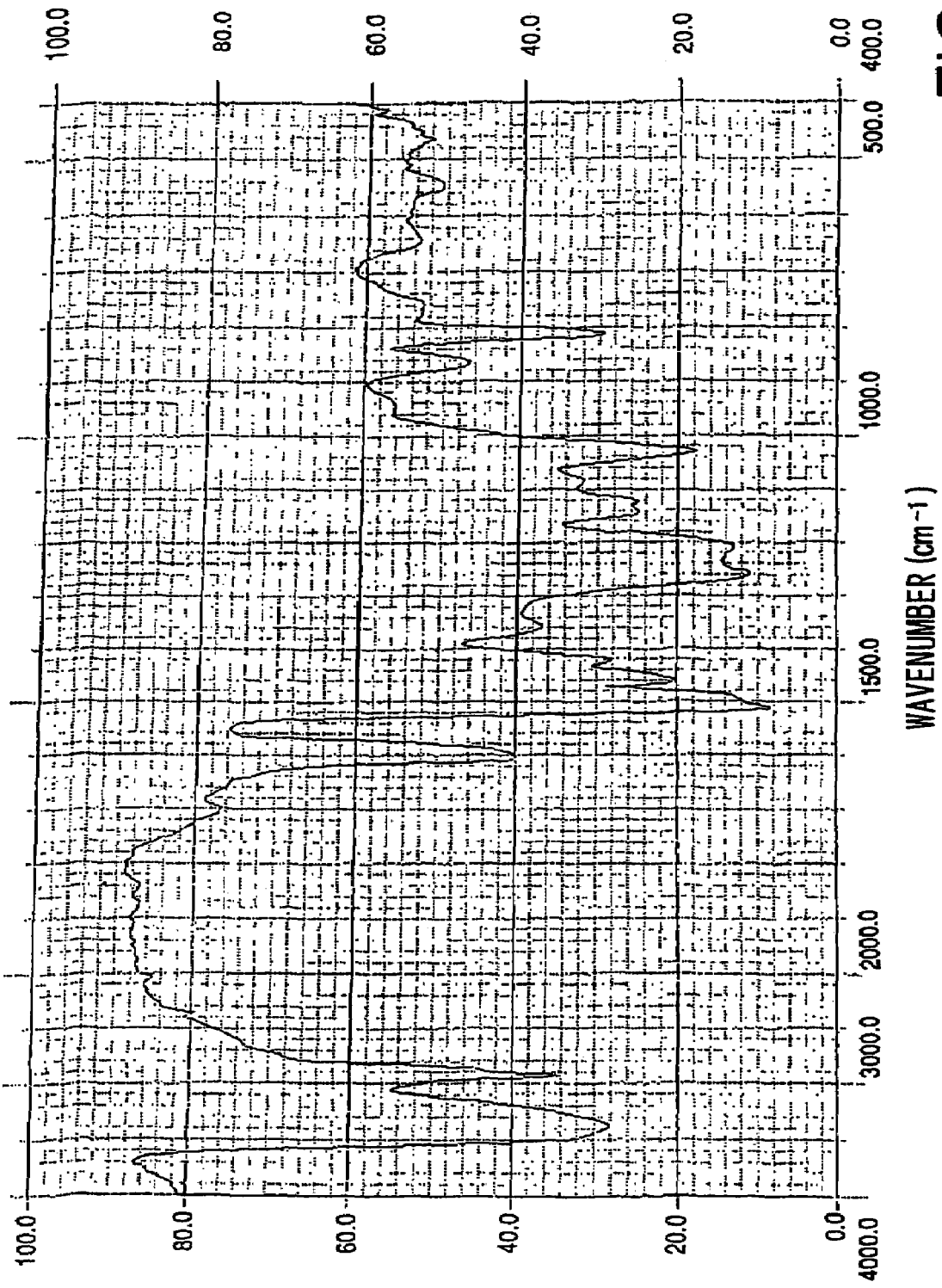
FIG. 20 is one example of an IR spectrum of an arylcoumaran derivative.

A UV spectrum (solvent: tetrahydrofuran) and an IR spectrum (KBr method) of an arylcoumaran derivative are shown in FIGS. 19 and 20.

(Preparation of a Lignin Cross-linking Derivative)

A lignin cross-linking derivative refers to a derivative in which a cross-linking functional group is introduced at an ortho- and/or para-position relative to a phenolic hydroxyl group of a lignophenol derivative. The weight-average molecular weight is preferably 2000 to 10000 and the amount of introduced cross-linking functional group is preferably 0.3 to 1.5 mol/C9 unit. A hydroxymethyl group is preferable as the cross-linking functional group.

A lignin cross-linking derivative can be obtained by mixing a lignophenol derivative with a compound that can form a cross-linking functional group on the lignophenol derivative to react under conditions by which the phenolic hydroxyl group of the lignophenol derivative will dissociate.

The conditions under which the phenolic hydroxyl group of the lignophenol derivative will dissociate are usually formed in a suitable alkali solution. The type and concentration of the alkali conditions and the solvent can be used without limitation so long as the phenolic hydroxyl group of the hybrid compound dissociates. For example, a 0.1N aqueous sodium hydroxide solution can be used.

The cross-linking functional group that is introduced into the lignophenol derivative is not particularly limited. Any cross-linking functional group may be used so long as it can be introduced at an aromatic ring of the main lignin structure or at an aromatic ring of the introduced phenol derivative.

More particularly, the cross-linking reactive group can be introduced into the aforementioned aromatic compound by mixing a polymerizable compound, such as formaldehyde, glutaraldehyde, diisocyanate and the like, with these compounds under conditions in which the phenolic hydroxyl group in a lignophenol derivative can dissociate. Because the β-aryl ether linkage also dissociates under such conditions, the lignophenol derivative is low-molecular species.

Upon mixing of the lignophenol derivative with the cross-linking functional group forming compound, in order to efficiently introduce the cross-linking functional group, a cross-linking functional group forming compound is preferably added at 1 or more mole-amount with respect to the aromatic ring of the lignin phenylpropane unit in the lignophenol derivative and/or the introduced phenol ring. More preferably, it is added at 10 or more mole-amount and, further preferably, 20 or more mole-amount.

Then, the cross-linking functional group is introduced into the introduced phenol ring under conditions in which the phenol derivative and the cross-linking functional group forming compound are present in alkali solution, or by heating if necessary. While the heating conditions are not particularly limited so long as a cross-linking functional group is introduced, the range of 40° C. to 100° C. is preferable. When the temperature is lower than 40° C., the cross-linking functional group forming compound reaction rate is very low and, when the temperature is higher than 100° C., side reactions result in addition to the introduction of the cross-linking functional group into the lignin, such as the cross-linking functional group forming compound reacting with itself. The range of 50° C. to 80° C. is more preferable and about 60° C. is further preferable.

The reaction is stopped by cooling the reaction solution and acidifying with hydrochloric acid having a suitable concentration (for example, around pH 2); the reaction mixture is washed and dialyzed to remove the acid and unreacted cross-linking functional group forming compound. After dialysis, the sample is recovered by lyophilization or the like. If needed, the sample is dried over phosphorus pentaoxide under reduced pressure.

(Structure of a Lignin Cross-linking Derivative)

Whether the desired functional group has been introduced at the o-position or p-position relative to the phenolic hydroxyl group in the thus obtained lignin cross-linking derivative or not, and the entire structure can be confirmed by a nucleus exchange method, $^1$H-NMR or the like.

Figure 21:
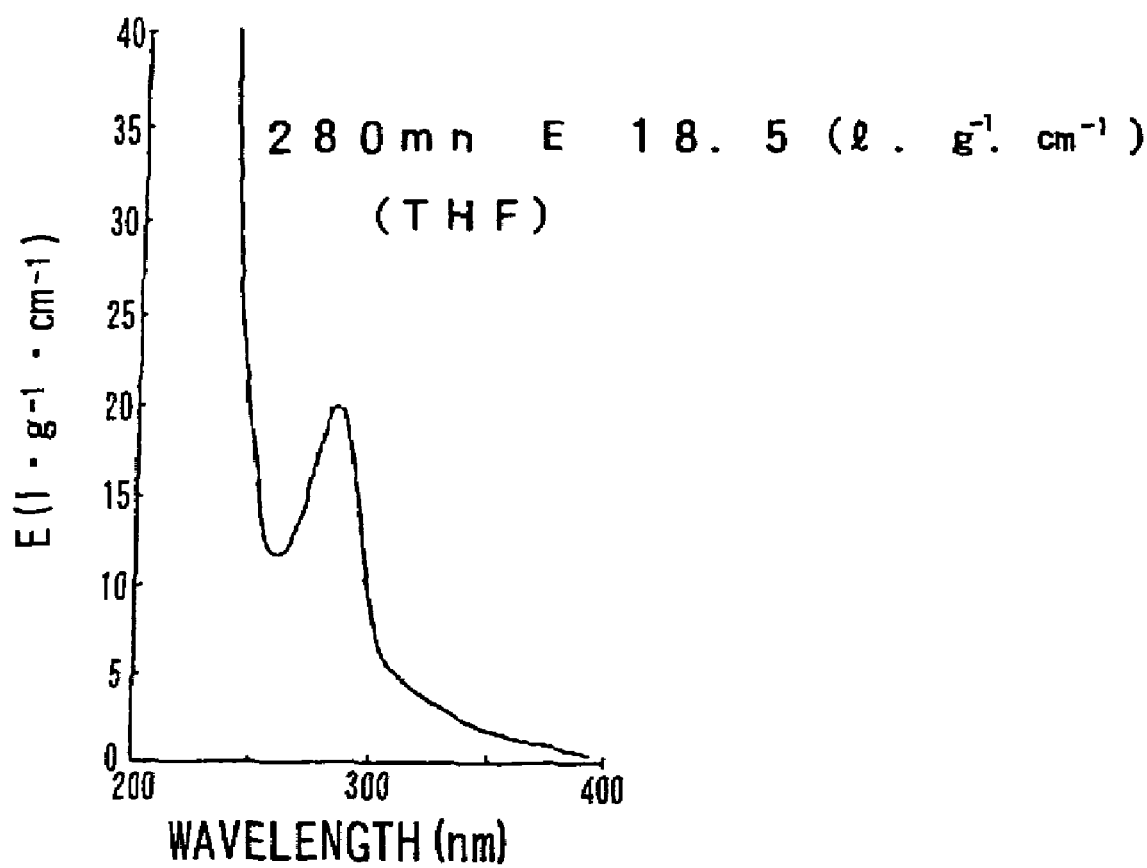
FIG. 21 is a view showing one example of a UV spectrum of a lignin cross-linking derivative.
Figure 22:
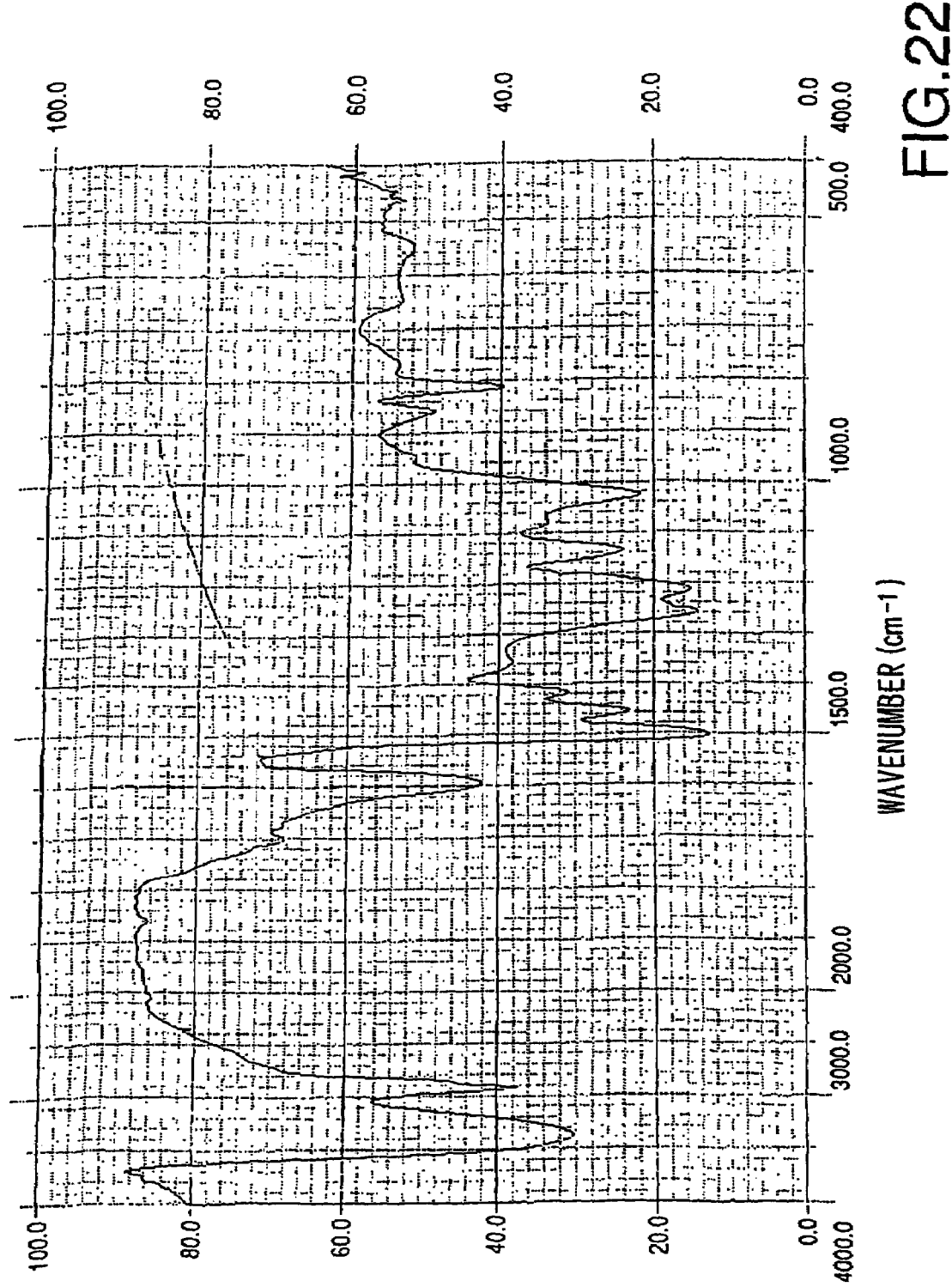
FIG. 22 is a view showing one example of an IR spectrum of a lignin cross-linking derivative.

A UV spectrum (solvent: tetrahydrofuran) and an IR spectrum (KBr method) of an arylcoumaran derivative are shown in FIGS. 21 and 22.

Figure 23:
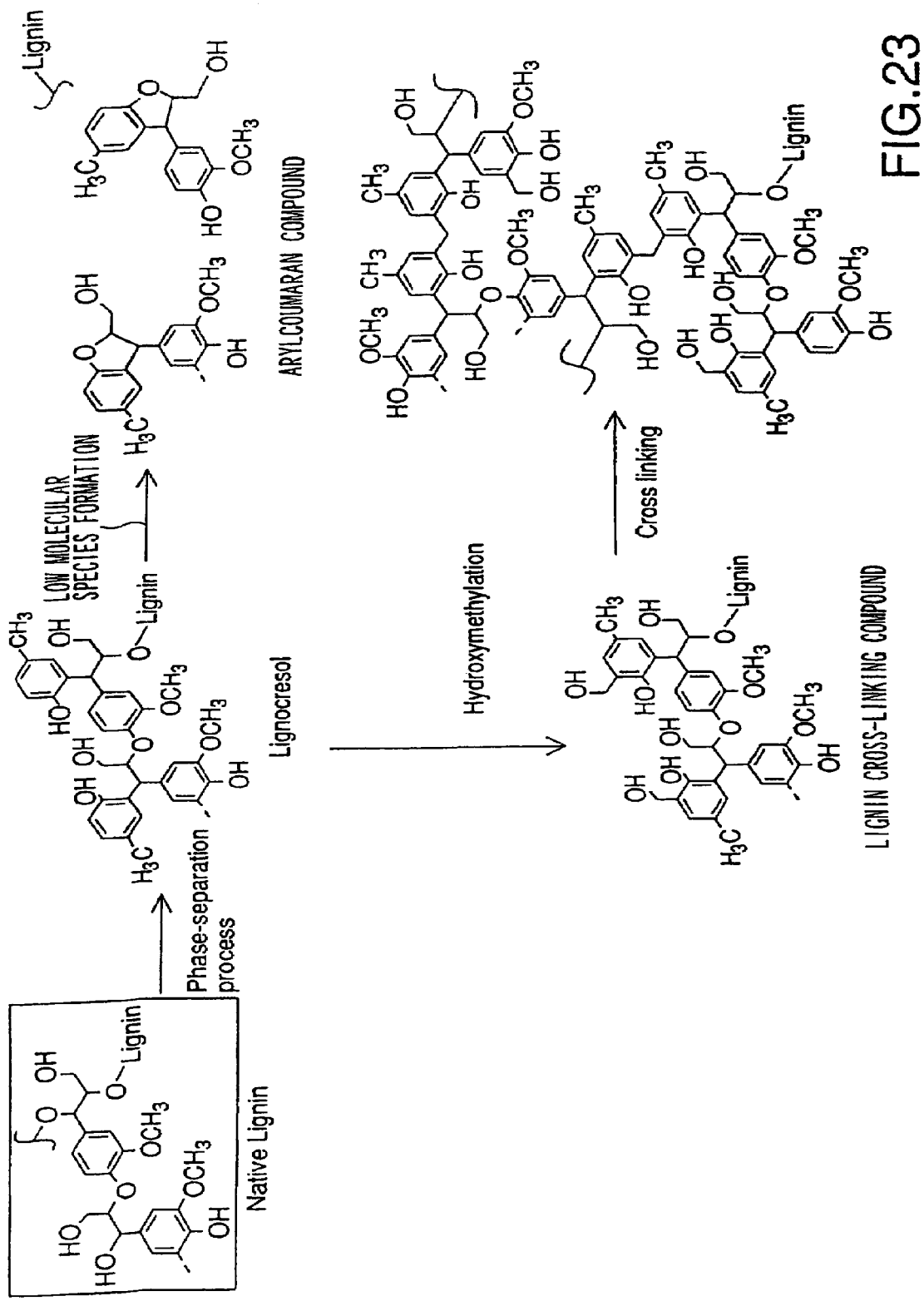
FIG. 23 is a view showing one example of a lignin structural conversion to a lignophenol derivative using p-cresol as a phenol derivative, an arylcoumaran derivative and a lignin cross-linking derivative.
Figure 24:
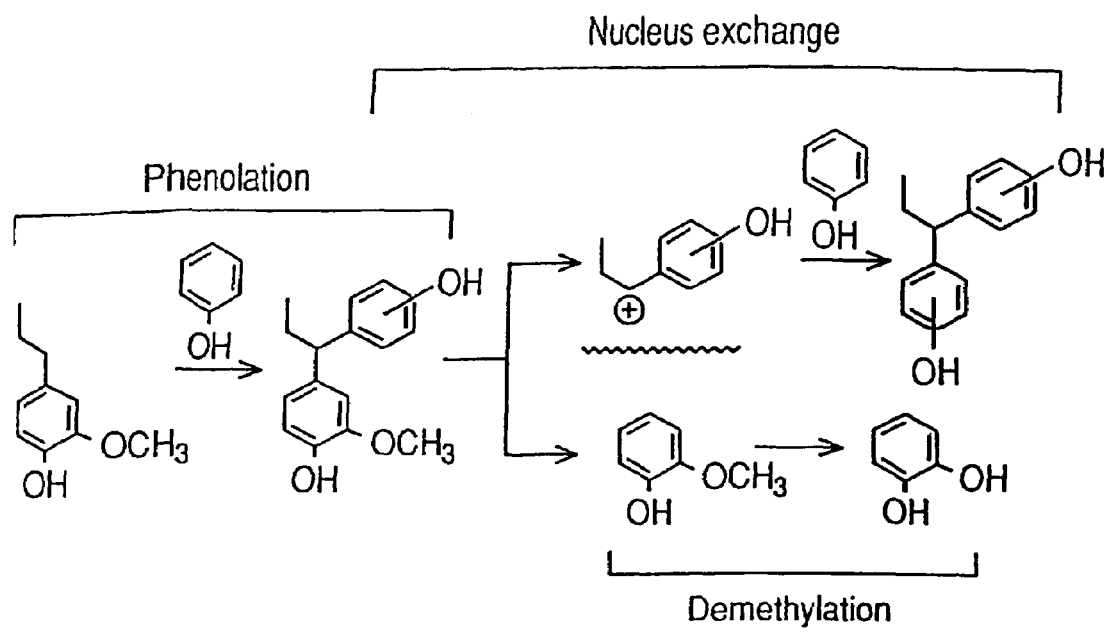
FIG. 24 is a view showing principal aspects of a nucleus exchange method.

In addition, in one example of structural conversion of lignin, a lignophenol derivative, an arylcoumaran derivative and a lignin cross-linking derivative are shown in FIG. 23. In this example, p-cresol is used as a phenol derivative and a hydroxymethyl group is introduced as the cross-linking functional group.

(A Method for Confirming the Properties of the Lignophenol Derivative, the Arylcoumaran Derivative and the Cross-linking Lignin Derivative)

1. Confirmation of Production of a Coumaran Unit and Quantification of the Distribution of the Phenolic Aromatic Ring The structure of an arylcoumaran derivative, or more particularly, the structure of an arylcoumaran fundamental unit, can be confirmed by comparing, before and after the alkali treatment, the frequency of the phenolic properties of the cresol ring and the lignin aromatic ring (mainly guaiacyl ring) by a ring conversion method combined with a periodate oxidation treatment.

A nucleus exchange method is a procedure by which a phenol monomer is quantitatively obtained from a phenol polymer, such as lignin, in a medium in which boron trifluoride ($BF_3$) and a large excess of phenol are present. The reaction of lignin with phenol in this nucleus exchange method introduces medium phenol at a sidechain α-position of lignin side to form a diphenylmethane type structure between a lignin aromatic ring and to further liberate this lignin aromatic ring as guaialcohol or the like and repeated DPM formation of the remaining introduced medium phenol and liberation of a phenol ring. By utilizing the quantitative properties of this reaction, the position at which the phenyl ring is bound- to an aliphatic sidechain in a phenylpropane unit of lignin can be determined.

Figure 25:
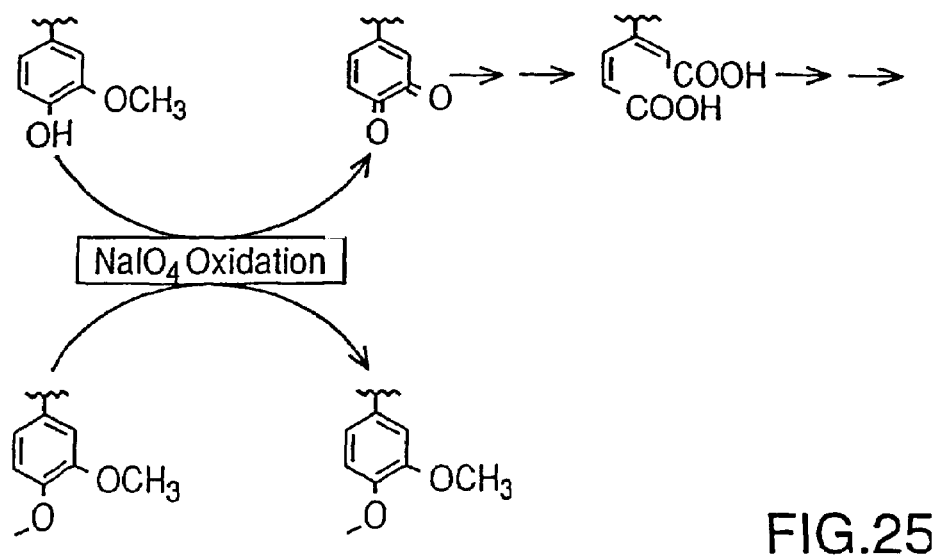
FIG. 25 is a view showing principal aspects of a periodate-oxidation treatment.

In addition, it is known that periodate treatment quantitatively destroys the phenolic aromatic ring as shown in FIG. 25. When combined with the nucleus exchange method utilizing this procedure, the distribution of hydroxyl groups in a lignin aromatic ring and an α-position introduced phenol ring can be analyzed.

A method for measuring the frequency of the phenolic properties of the cresol ring and the guaiacyl ring and confirming production of the coumaran unit by utilizing a nucleus exchange method is provided below.

Figure 26:
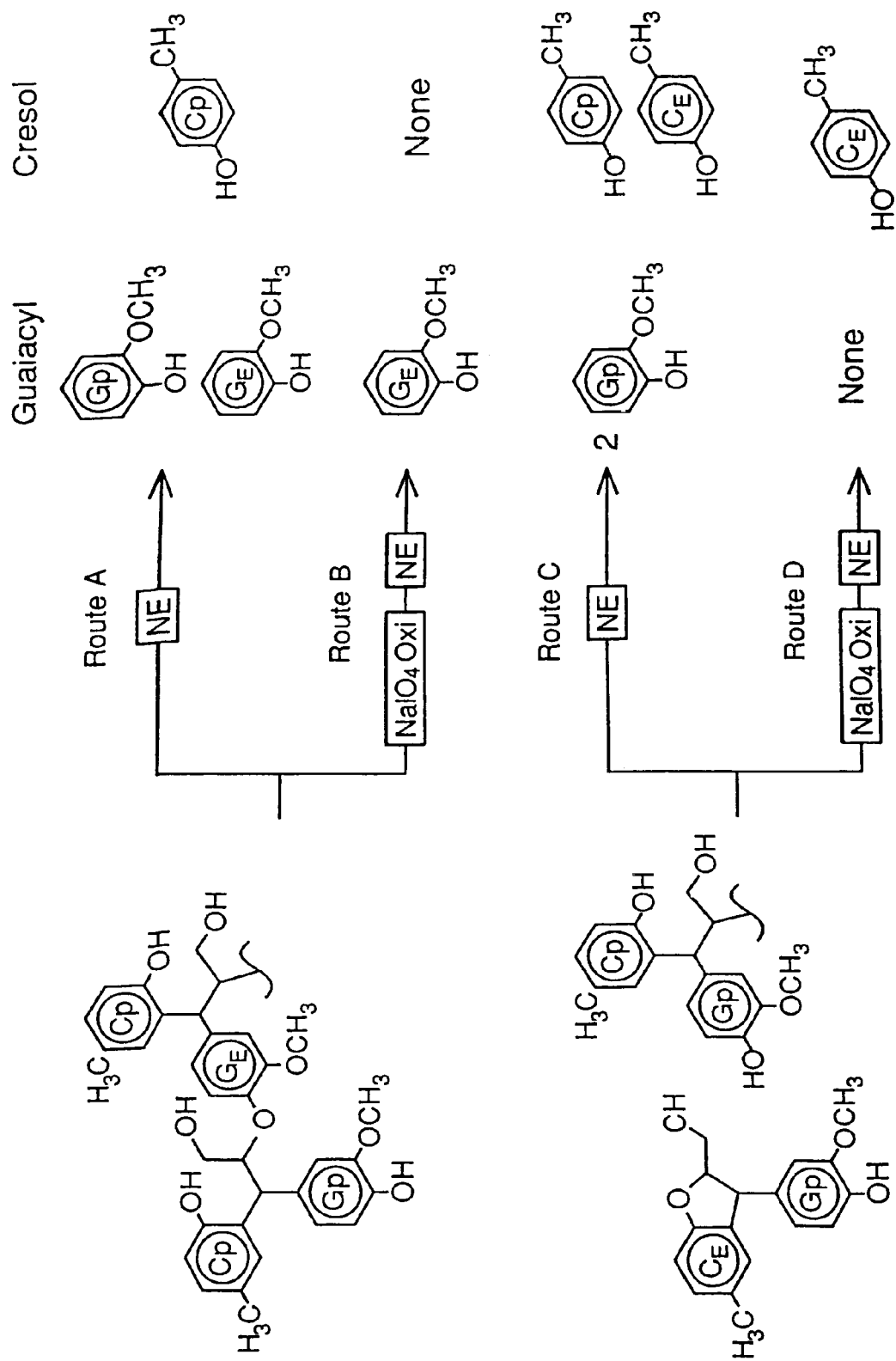
FIG. 26 is a view showing one example of the structural analysis in which a nucleus-exchange method and a periodate-oxidation method are applied to an arylcoumaran derivative.

The following explanation provides one example for analyzing the lignocresol exemplified in FIG. 23, which is one kind of a lignophenol derivative using p-cresol as a phenol derivative, and an arylcoumaran derivative shown in FIG. 26 that is obtained by using this lignophenol as a starting material is explained. By utilizing this analyzing example, the fundamental unit of other arylcoumaran derivatives can be similarly confirmed. The symbols shown in FIG. 26 represent the following structures:

Gp: Phenolic guaiacyl ring
GE: Ether type guaiacyl ring
CP: Phenolic cresol ring introduced at an α-position
CE: Ether type cresol ring introduced at an α-position As shown in FIG. 26, when this lignophenol is nucleus exchange-treated, because cresol has a cresol ring at an α-position at high frequency, a DPM type structure is formed between guaiacyl ring-cresol ring from initiation. Therefore, the lignophenol is rapidly nucleus exchanged and, regardless of the phenolic properties of the guaiacyl ring, the guaiacyl ring and the cresol ring are liberated as a monomer. That is, cresol liberation is of all CP origin and guaiacyl ring (guaialcohol and catechol) liberation is of GP and GE origin.

However, when the periodate treatment is performed, because cresol (CP) is all phenolic, the cresol ring is destroyed and, at the same time, the phenolic guaiacyl ring is also destroyed. An ether type guaiacyl ring (GE) remains and liberation by a nucleus exchange method provides only the non-phenolic guaiacyl ring (GE).

On the other hand, when an arylcoumaran derivative is produced as a low-molecular species, this lignocresol is directly nucleus exchange-treated by the alkali treatment and the same number as that of the hybrid compound before the alkali treatment of a guaiacyl ring and a cresol ring are liberated. When this low-molecular species compound is nucleus exchange-treated after the periodate treatment, only an ethereal cresol ring (CE) forming an arylcoumaran structure is liberated.

Therefore, whether α-position-introduced cresol is bound to the β-carbon in the alkali treatment or not (whether a coumaran unit was formed or not) and whether the phenolic properties were newly manifested in the guaiacyl ring or not, i.e., whether a coumaran structure was produced or not, can be confirmed by the type of liberated phenols that are obtained by performing the 4 kinds of nucleus exchange treatments, either alone, and either before and after the alkali treatment, and the periodate oxidation decomposition and the treatment combined with nucleus exchange and by the difference in yields thereof.

More particular procedures are indicated below.

(Preparation of a Lignophenol Derivative Sample and an Arylcoumaran Derivative Sample)

Each sample used for the nucleus exchange treatment and the periodate treatment was prepared as follows:

The lignophenol derivative sample was prepared as follows: After p-cresol was adsorbed onto wood powder, 72% sulfuric acid was added to treat at room temperature for 60 minutes, all the reaction solution was placed into an excess of water and the insoluble fractions were collected by centrifugation, dialyzed and dried. The dried material was extracted with acetone, the soluble fraction was added dropwise to an excess of ethyl ether, and the resulting insoluble fraction was dried on $P_2O_5$.

An arylcoumaran derivative sample was prepared by treating the lignophenol derivative (lignocresol) obtained as described above in a 0.5N aqueous NaOH solution at 140° C. for 60 minutes, acidifying to pH 2 with 1N hydrochloric acid, washing the precipitates under neutral conditions, lyophilizing and drying on $P_2O_5$.

(Preparation of a Nucleus Exchange Reagent)

The reagent used for the nucleus exchange treatment was a mixture of phenol (Nakalai Tesque, Inc., extra pure reagent), xylene (Nakalai Tesque, Inc., extra pure reagent) and boron trifluoride-phenol complex (contained at 25%, Nakalai Tesque, Inc., extra pure reagent) at a volume ratio of 19:10:3.

(Nucleus Exchange Treatment)

A suitable amount of a lignophenol derivative or an arylcoumaran derivative sample was placed into a 3 ml stainless steel microautoclave already containing two steel balls for stirring, and 2 ml of a nucleus exchange reagent was added thereto. The autoclave was sealed and stirred for 10 minutes or more to homogenize the contents. Thereafter, the autoclave was immersed into an oil bath at 110° C. and heated for 4 hours. During heating, the contents in the autoclave were stirred every 30 minutes.

After completion of the reaction, the autoclave was taken out of the oil bath, placed into water, and the reaction was stopped by cooling. Silicone oil adhered to the autoclave was wiped completely clean, the autoclave was opened, and the contents were transferred into a 100 ml beaker by washing with a small amount of diethyl ether (Wako Pure Chemical Industries Co., Ltd., extra pure reagent). A solution of a known amount of an internal standard substance (dibenzyl (Tokyokasei Kogyo Co., Ltd. extra pure reagent)) in benzene (Wako Pure Chemical Industries Co., Ltd., extra pure reagent) (12 mg/ml) was added thereto, the ether-insoluble was filtered with a glass fiber filter (Whatman GF/A 4.5 cm) and washed a few times with diethyl ether. The filtered material was transferred to a 300 ml separating funnel and a saturated sodium chloride solution and sodium chloride (Nakalai Tesque, Inc., extra pure reagent) were added with vigorous shaking to inactivate the $BF_3$. The ether layer was recovered and concentrated to about 10 ml relative to 1 ml of a reagent. The concentrated material was transferred into a 50 ml Teflon-liner screw vial, anhydrous sodium sulfate (Wako Pure Chemical Industries Co., Ltd., extra pure reagent) was added and dehydrated overnight in a cool place.

(Quantification of Product)

50 μl of the dehydrated ether solution was placed into a 1 ml Teflon-liner screw vial, one droplet of pyridine (Wako Pure Chemical Industries Co., Ltd., extra pure reagent) and 100 μl of Bis (trimethylsilyl) trifluoroacetamide, BSTFA (Aldrich, 99+%) were added thereto, and allowed to stand at room temperature for 1 hour to perform the TMS treatment. A TMS derivative of a liberated monomer was quantified by gas chromatography (GLC). The produced amount was calculated from a calibration curve for a monomer. The GLC conditions were as follows:

Apparatus: YANAGIMOTO G-3800
Column: Crosslinked methyl silicon capillary column (Quardrex s2006:0.25 mm I.D. 50 m length 0.251 μm Film thickness)
Sensitivity: 10-1
Attenuator: 1/1
Column temp.: Initial temp.: 130° C., 6 min.
:Rate: 3.0° C./min.
:Final temp.: 190° C.
Injection temp.: 230° C.
Carrier gas: Helium
Detector: FID (Preparation of a Periodate Oxidizing Reagent)

500 ml of a solution of glacial acetic acid (Wako Pure Chemical Industries Co., Ltd., extra pure reagent): water (3:2 (v/v)) was added to 15 g of sodium methaperiodate (Nakalai Tesque Inc, extra pure reagent). The periodate oxidizing reagent was placed in a brown reagent bottle and stored at 4° C.

(Periodate Oxidation Treatment)

1 ml of glacial acid was added to 100 mg of a lignophenol derivative or an arylcoumaran derivative sample to dissolve the sample as soon as possible, and 15 ml of a periodate oxidizing reagent was added with stirring to perform the treatment at 4° C. for 3 days. After treatment, the mixture was added dropwise into 200 ml of ice-cooled water under stirring, the resulting precipitates were centrifuged (5° C., 3500 rpm, 10 min.) to recover the precipitates, washed with cool water, and lyophilized to dry over $P_2O_5$ in order to obtain the periodate oxidation treatment sample. This sample was nucleus exchange-treated as described above, and subsequently the product was quantified according to the aforementioned product quantifying method.

2. Quantification of the Amount of Introduced Cresol and Hydroxyl Group

Quantification of the amount of introduced cresol and hydroxyl group was analyzed by $^1$H-NMR.

The hybrid compound and the arylcoumaran derivative were prepared as samples as is or as an acetylated material.

Each 20 mg of the sample and 3 mg of p-nitrobenzaldehyde (PNB) as an internal standard were weighed precisely into a 1 ml vial, which was completely dissolved in deuterated pyridine:deuterated chloroform (1:3) (an acetylation sample was dissolved only with deuterated chloroform) using an Eppendorf pipette to obtain a sample for measurement.

Measurement by $^1$H-NMR was performed using an R-90H Fourier transformation type nuclear magnetic resonance apparatus manufactured by HITACHI. From the integrated curve of the resulting chart, the amount of introduced cresol was calculated according to the following calculating method.

(Analysis)

The following is an example of an analysis that can be applied to the lignocresol produced using cresol as a phenol derivative, an arylcoumaran derivative produced by further treating this lignocresol and a cross-linking lignin derivative.

(1) Quantification of the Amount of Introduced Cresol $^1$H-NMR was performed using the HITACHI R-90H Fourier transformation type nuclear magnetic resonance apparatus. From the integrated curve for the resulting chart, the amount of introduced cresol was obtained according to the following calculating method.

$$I\ wt\ \%=\{Pwt/Pm \times Pn/Pi \times Ci/Cn \times (Cm-1)\}/Lwt \times 100$$

$$I\ mol/C9=\{I\ wt\ \%/(Cm-1))/\{(100-I\ wt\ \%)/Lm\}$$

Wherein:
I wt %: Amount of introduced cresol (wt %)
Pwt: Weight of PNB (mg)
Pn: Number of aromatic ring Hs in PNB (4)
Pi: Integrated value of an area indicating an aromatic ring 4H signal in PNB (8.40-7.80 ppm)
Ci: Integrated value of an area indicating a methyl group 3H signal in introduced cresol (2.40-1.60 ppm)
Cn: Number of protons of a methyl group introduced cresol (3).
Cm: Molecular weight of introduced cresol (108)
Lwt: Weight of lignocresol (hybrid derivative) (mg)
I mol/C9: Amount of introduced cresol (mol/C9)
Lm: Molecular weight of 1 unit of lignin (200)

(2) Quantification of the Amount of Hydroxyl Group

Measurement of $^1$H-NMR was performed using the same apparatus as the aforementioned apparatus based on the same sample preparing method. From the integrated curve for the resulting chart, the amount of a phenolic hydroxyl group and that of an aliphatic hydroxyl group were calculated according to the following calculating method.

Because the $^1$H-NMR spectrum for an acetylated sample has an area indicating a phenolic acetoxyl proton signal (2.40-2.03 ppm) and an area indicating an aliphatic acetoxyl proton signal (2.03-1.60 ppm) that overlap with an area indicating a methyl proton signal of that introduced cresol (2.40-1.60 ppm), each integrated value was corrected according to the following equations:

$$Aph=Aph'-Oph \times Aar/Oar$$

$$Aali=Aali'-Oali \times Aar/Oar$$

Aph: An integrated value for an area indicating a phenolic acetoxyl proton signal (corrected value)
Aph': An integrated value for an area indicating a phenolic acetoxyl proton signal in an acetylated sample (corrected value)
Oph: An integrated value for an area (2.40-2.03 ppm) that overlaps with the phenolic acetoxyl proton of an acetylated sample in the original sample
Aar: An integrated value for an area indicating an aromatic proton signal (7.80-6.30 ppm) in the acetylated sample
Oar: An integrated value for an area indicating an aromatic proton signal (7.80-6.30 ppm) in the original sample
Aali: An integrated value for an area indicating an aliphatic actoxyl proton signal (corrected value)
Aali': An integrated value for an area indicating an aliphatic acetoxy]proton signal (2.03-1.60 ppm) in the acetylated sample Oali: An integrated value for an area (2.03-1.60 ppm) that overlaps with the phenolic acetoxyl proton of the acetylated sample in the original sample The amount of hydroxyl group was calculated based upon these corrected-values:

$$phOHwt\% = (Pwt/Pm \times Pn/Pi \times Aph/An \times OHm)/[Alwt - \{Pwt/Pm \times Pn/Pi \times (Aph + Aali)/An \times Acm - 1)\}] \times 100$$

$$aliOHwt\% = (Pwt/Pm \times Pn/Pi \times Aali/An \times OHm)/[ALwt - \{(Pwt/Pm \times Pn/Pi \times (Aali + Aph)/An \times Acm - 1)\}] \times 100$$

$$phOHmol/C9 = (phOHwt\%/OHm)/\{(100 - I\ wt\%)/Lm\}$$

$$aliOHmol/C9 = (aliOHwt\%/OHm)/\{(100 - I\ wt\%)/Lm\}$$

phOHwt %: the amount of a phenolic hydroxyl group (wt %)
Pwt: Weight of PNB (mg)
Pm: Molecular weight of PNB (151)
Pn: Number of aromatic ring Hs in PNB (4)
Pi: Integrated value for an area indicating an aromatic ring 4H signal (8.40-7.80 ppm) in PNB
Aph: Integrated value for an area showing a signal of phenolic acetoxyl proton (corrected value)
An: Proton number of a methyl group in an acetoxyl group (3)
OHm: Mass number of a hydroxyl group (17)
ALwt: Weight of acetylated lignin (mg)
Aali: Integrated value for an area showing a signal of aliphatic acetoxyl proton (corrected value)
Acm: Mass number of an acetoxyl group (43)
phOHmol/C9: Amount of phenolic hydroxyl group (mol/C9)
I wt %: Amount of introduced cresol (wt %)
Lm: Molecular weight of 1 unit of lignin (200)
aliOHwt %: Amount of an aliphatic hydroxyl group (wt %)
aliOHmol/C9: Amount of an aliphatic hydroxyl group (mol/C9)

3. Quantification of a Hydroxymethyl Group of a Lignin Cross-linking Derivative

An example is explained below in which formaldehyde was used as a cross-linking functional group forming compound and a hydroxymethyl group was introduced as a cross-linking functional group. Also in the case where the other functional group was introduced, a structure can be determined similarly. Formaldehyde was calculated according to the following equation on the assumption that formaldehyde is all introduced as a hydroxymethyl group.

HMwt %: Weight of hydroxymethyl (wt %)
Pwt: Weight of PNB (mg)
Pm: Molecular weight of PMB (151)
Pn: Number of aromatic ring H in PNB (4)
Pi: Integrated value for an area showing an aromatic ring 4H signal (8.40-7.80 ppm) in PNB
Mi: Integrated value for an area showing a methylene signal ($-CH_2-OAc$) in a hydroxymethyl group (5.20-4.70 ppm)
Mn: Proton number of a hydroxymethyl group (2)
HMm: Mass number of a hydroxymethyl group (31)
Aph: Integrated value for an area showing a signal of phenolic acetoxyl proton (corrected value)
Aali: Integrated value for an area showing a signal of aliphatic acetoxyl proton (corrected value)
An: Proton number of a methyl group in an acetoxyl group (3)
ALwt: Weight of acetylated lignin (mg)
Acm: Mass number of an acetoxyl group (43)
HMmol/C9: Amount of a hydroxymethyl group (mol/C9)
I wt %: Amount of introduced cresol (wt %)
Lm: Molecular weight of 1 unit of lignin (200)

$$HMwt\% = (Pwt/Pm \times Pn/Pi \times Mi[Mn \times HMm)/[ALwt - Pwt/Pm \times Pn/Pi \times (Aph + Aali)/An \times (Acm - 1)]\}] \times 100$$

$$HMmol/C9 = (HMwt\%/HMm)/[\{(100 - (I\ wt\% + HMwt\%)\}/Lm)$$

4. Average Molecular Weight

Measurement of average molecular weight in a lignophenol derivative, an arylcoumaran derivative and a lignin cross-linking derivative was performed by gel permeation chromatography. A sample for measurement was prepared by placing about 2 ml of distilled and degassed tetrahydrofuran (THF) (manufactured by Wako Pure Chemical Industries., Ltd., extra pure reagent) and each 1 mg of derivative in a test tube, stirring with a touch mixer to dissolve completely, adding one droplet of an about 4% p-cresol solution in THF as an internal standard substance to make completely uniform and filtering with a COSMONICE Filter "S". The measuring conditions were as follows:

Column: Shodex KF802 and KF804
Solvent: THF
Flow rate: 1 ml/min.
Detector: UV (280 nm)
Range: 0.32
Amount of sample: 50 μl A calibration curve was made using a Polystyrene standard (Mw: 390000, 233000, 100000, 25000, 9000, 4000, 2200, 760); bisphenol A and p-cresol provided that molecular weight of polystyrene was multiplied by a ratio of Q factor (0.5327) taking the molecular form of a hybrid derivative and an arylcoumaran derivative as well as polystyrene into consideration. The weight-average molecular weight (Mw), number-average molecular weight (Mn) of each sample were calculated according to the following equations and a variance ratio (Mw/Mn) was also calculated.

$$Mw = \Sigma(Hi \times Mi)/\Sigma Hi$$

$$Mn = \Sigma Hi/\Sigma(Hi/Mi)$$

wherein Hi is the Height of chromatogram read every 0.5 ml
Mi: Molecular weight read from the calibration curve every 0.5 ml (Material for Molded Product Other than the Arylcoumaran Derivative and the Lignin Cross-linking Derivative)

As molding materials that are used for manufacturing molded products of the present invention, natural or synthetic fibrous, chip-like or powdery materials are used as molding substrate materials in addition to these lignin derivatives. The form of the molding substrate material is not limited to these forms and various forms can be widely used.

As fibrous molding substrate materials, various fibers such as natural or synthetic various hydrocarbon fibers, metal fibers, glass fibers, ceramic fibers, and fibers recycled from these fibers can be used.

Among others, cellulose fibers are preferable because they are readily available and reproducible. As the cellulose fiber, mechanical pulp, chemical pulp, semichemical pulp and pulps recycled from these pulps, as well as various artificial cellulose fibers synthesized using these pulps as a raw material can be used.

As a raw material for such the cellulose fiber, either timber fiber using a coniferous tree and a broadleaf tree as a raw material, or non-timber fiber such as paper mulberry, kenaf, Manila hemp, straw and bagasse can be utilized.

In addition, cellulose fibers obtained by splitting various products such as boards, newspapers and the like, which are pulp processed products manufactured from a lignocellulose material, also may be used.

As chip-like molding substrate materials, various materials such as natural or synthetic various hydrocarbon, metal, glass, ceramic and the like can be used. As hydrocarbon chips, natural cellulose chips from timber or non-timber materials may be used. As metal chips, alumina chips may be used. As ceramic chips, chips such as $Al_2O_3$, $SiO_2$ and the like may be used. From the same reason as that for fibrous molding substrate materials, cellulose chips are preferable.

As powdery molding substrate materials, a molding material which is made into a powder by grinding or is originally in powder form and which is derived from the same material as that for the aforementioned chip material can be used.

(Preparation of a Molded Product Using an Arylcoumaran Derivative and/or a Lignin Cross-linking Derivative)

In order to prepare a molded product, only an arylcoumaran derivative can be used, or only a lignin cross-linking derivative can be used, or both the arylcoumaran derivative and the lignin cross-linking derivative can be used.

In order to prepare a molded product using an arylcoumaran derivative and/or a lignin cross-linking derivative (hereinafter referred to as secondary derivative or the like), a secondary derivative or the like, which is in melted state or a solvent dissolved state (hereinafter this state is referred to as liquefied state), is added to a molding substrate material and a secondary derivative or the like in this liquefied state and is solidified.

The secondary derivative or the like exhibits caking properties when it changes from the liquefied state into a solid. That is, when it precipitates into a solid by distilling the solvent off from the liquefied state, or when it solidifies from a melted state by cooling, the adhesive properties and the caking properties are exhibited. By utilizing such a caking property exhibiting process, the secondary derivative or the like can be used as a binder for mutually adhering molding substrate materials.

Therefore, upon preparation of the molded product, the secondary derivative or the like is usually passed through a process in which a secondary derivative or the like in a solution state is added to the molding material and is liquefied and thereafter, the solvent is distilled off, or a process in which a secondary derivative or the like in the solid state is added, heated to melt and liquefy and then cooled.

The secondary derivative or the like solution used herein is a liquid in the state in which the secondary derivative or the like is dissolved in a solvent. As a solvent used for this derivative solution, acetone, ethanol, methanol, dioxane, tetrahydrofuran, or a mixture of each of them with water can be used. In addition, a secondary derivative or the like solution obtained in a step for synthesizing and separating a secondary derivative or the like from a lignocellulose material may be also used.

For example, as a method for preparing a molded product, a method comprising steps shown FIGS. 27 to 31 is provided.

Figure 27:
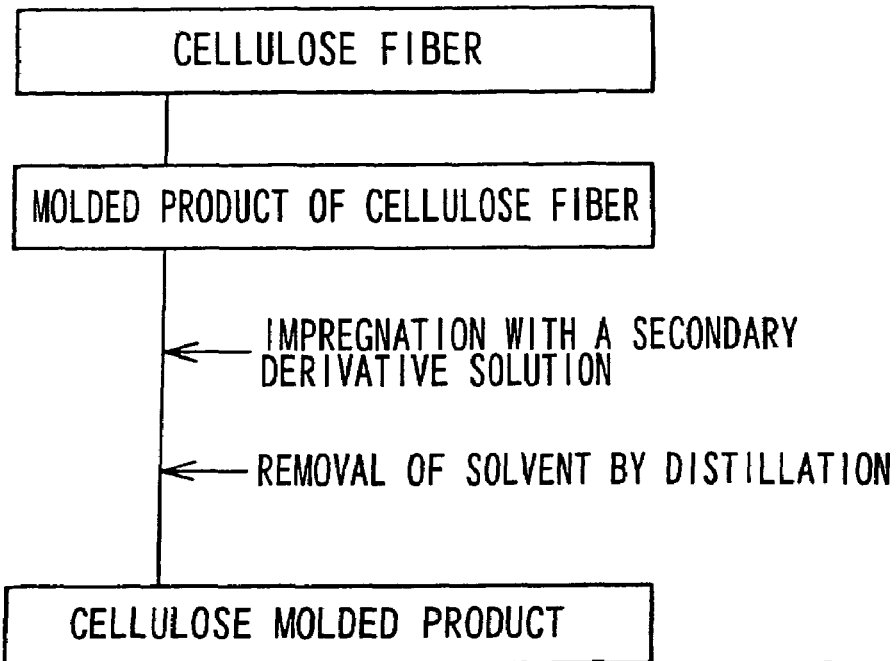
FIG. 27 is a view showing steps for manufacturing a molded cellulose product using a secondary derivative.

As shown in FIG. 27, a cellulose fiber is molded, and this molded product is impregnated with a secondary derivative or the like solution and a solvent is distilled off. By removal of a solvent by distillation, the secondary derivative or the like provides caking properties and adhesive properties to molding materials. As a result, the secondary derivative or the like is attached to the cellulose fiber to obtain a molded product in the state in which the secondary derivative or the like acts as a binder. If needed, this molded product may be further molded by pressurizing and/or heating.

Figure 28:
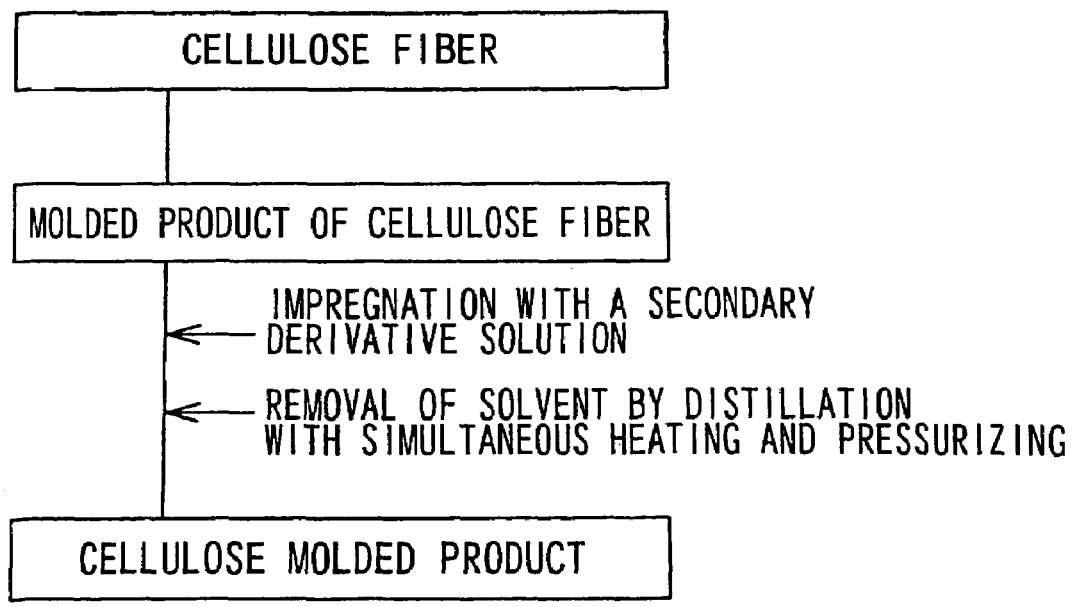
FIG. 28 is a view showing steps for manufacturing a molded cellulose product using a secondary derivative.

Alternatively, as shown in FIG. 28, a cellulose fiber is molded, and the molded product is impregnated with a secondary derivative or the like solution. Thereafter, the solvent is distilled off by pressurizing and/or simultaneously heating this molded product. By removal of the solvent by distillation, a secondary derivative or the like provides caking properties and adhesive properties to molding materials. As a result, a lignophenol molded product in the state in which a secondary derivative or the like acts as a binder can be obtained.

Figure 29:
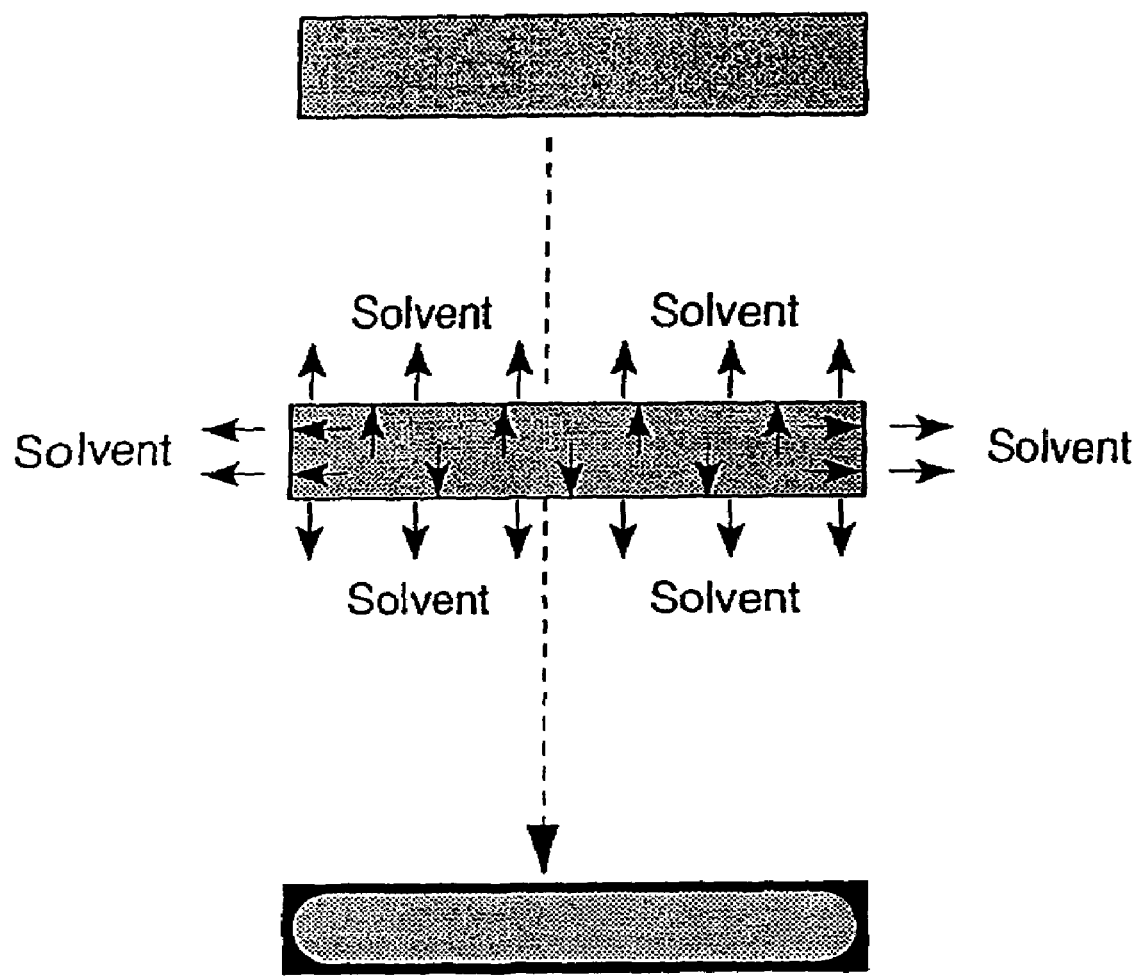
FIG. 29 is a view showing transference of a secondary derivative upon removal by distillation of a solvent from a molded product, which solvent had solvated the secondary derivative.

According to methods shown in FIGS. 27 and 28, a secondary derivative or the like is transferred to the surface layer side in the solvent distillation step. FIG. 29 shows transference to the surface layer exemplified with an arylcoumaran derivative. That is, a large amount of secondary derivative or the like is attached to the surface layer of the molded product. Therefore, because a large amount of secondary derivative or the like is present on the surface layer side by attaching a relatively small amount of the secondary derivative or the like, a molded product having water-resistance and strength can be obtained by the binding action of the secondary derivative or the like on the surface layer side.

In this case, particularly when a highly hydrophobic arylcoumaran is used, i.e., an arylcoumaran derivative synthesized from a lignophenol derivative with cresol, a highly hydrophobic molded product can be efficiently obtained.

Figure 30:
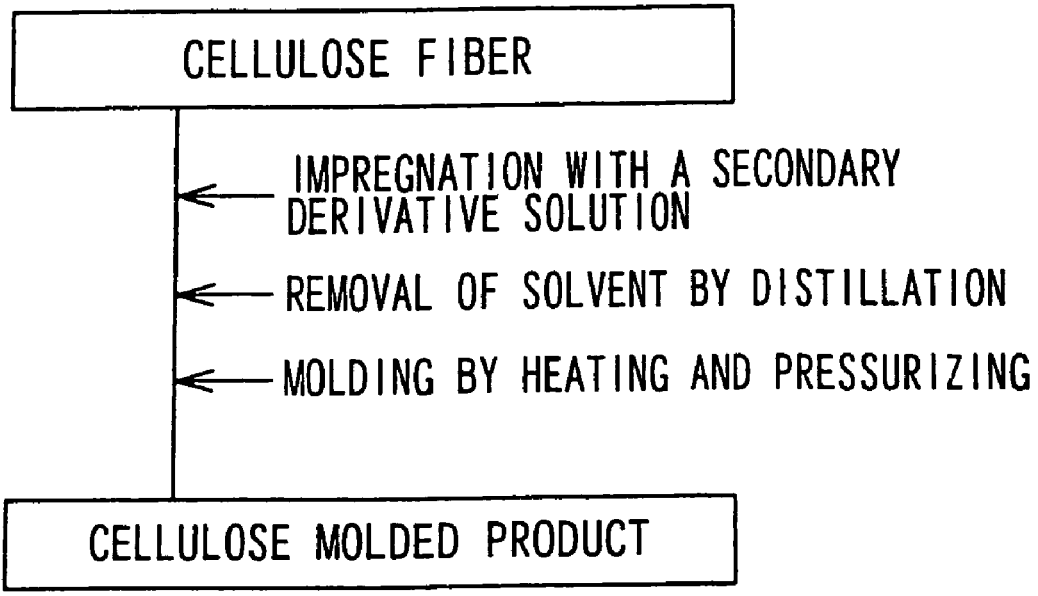
FIG. 30 is a view showing steps for manufacturing a molded cellulose product using a secondary derivative.

Further, as shown in FIG. 30, after cellulose fiber in the unmolded state is impregnated with the secondary derivative or the like, the solvent is distilled off. Thereafter, this fiber is molded by heating and/or pressurizing.

According to this method, a secondary derivative or the like is attached to a fiber in advance using the adhesive properties by distilling the solvent off. As such, by molding with heating and pressurization using a fiber to which a secondary derivative or the like is attached in the solid state in advance, a molded product in which a secondary derivative or the like is uniformly distributed throughout the product can be molded via from the liquid state to the solid state. Therefore, this method is preferable as a process for preparing a molded product having uniform properties.

Figure 31:
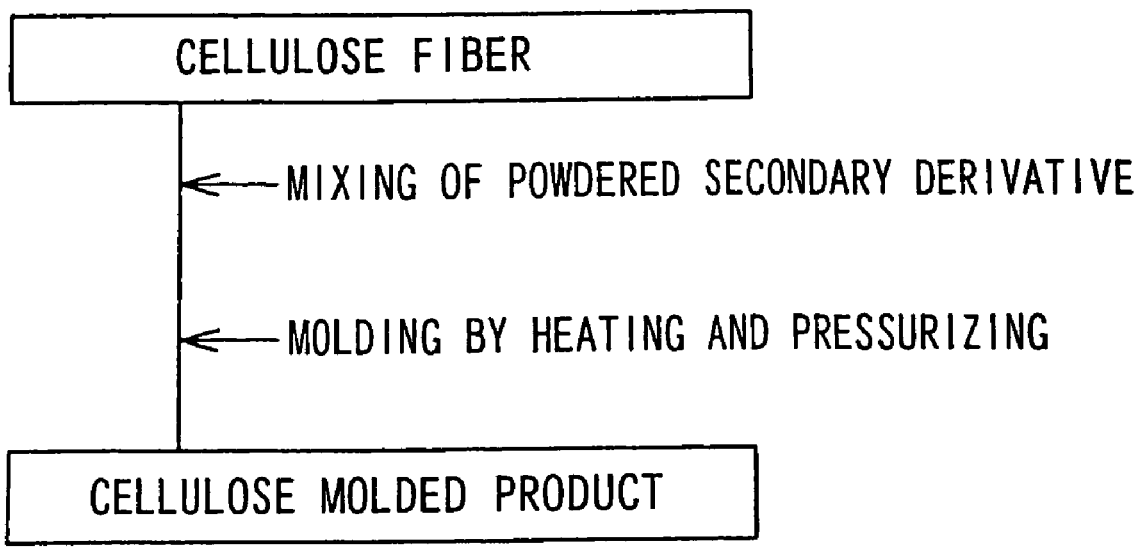
FIG. 31 is a view showing steps for manufacturing a molded cellulose product using a secondary derivative.

Further, as shown in FIG. 31, a powdery secondary derivative or the like is mixed into a cellulose fiber and molded by heating and/or pressurizing. Alternatively, prior to the final molding, a provisional molding step can be performed by pressurizing. Thereafter, such provisionally molded product is heated to mold and, if necessary, pressurized. According to this method, the solvent distillation step becomes unnecessary. In addition, a molded product in which a secondary derivative or the like is uniformly distributed throughout the product can be formed and thus, a molded product having uniform physical properties can be manufactured.

In addition, upon preparation of the molded product from various molding materials and a secondary derivative or the like, provisional molding before molding or a molding method can be variously selected and added and further other additional steps may be added. For example, when a fibrous pulp is used as the molding material, a wet process or a dry process for forming a molded product and a provisional molding method and the like may be used and are different processes.

(Preparation of a Molding Product Using a Lignin Cross-linking Derivative)

In a molded product using a lignin cross-linking derivative, the molding substrate can be strengthened by cross-linking and heating the molding substrate material to which the linking cross-linking derivative is attached. Heating may be accompanied with pressurizing. Formation of cross-links is also possible by heating when distilling the solvent off from the molding substrate material to which a cross-linking derivative in the liquid state is attached.

In the case of a molded product in which cross-linking of a cross-linking derivative was performed, the hydrophobicity is improved and, in particular, the strength is improved.

(Recovery of an Arylcoumaran Derivative from an Molded Product)

Figure 32:
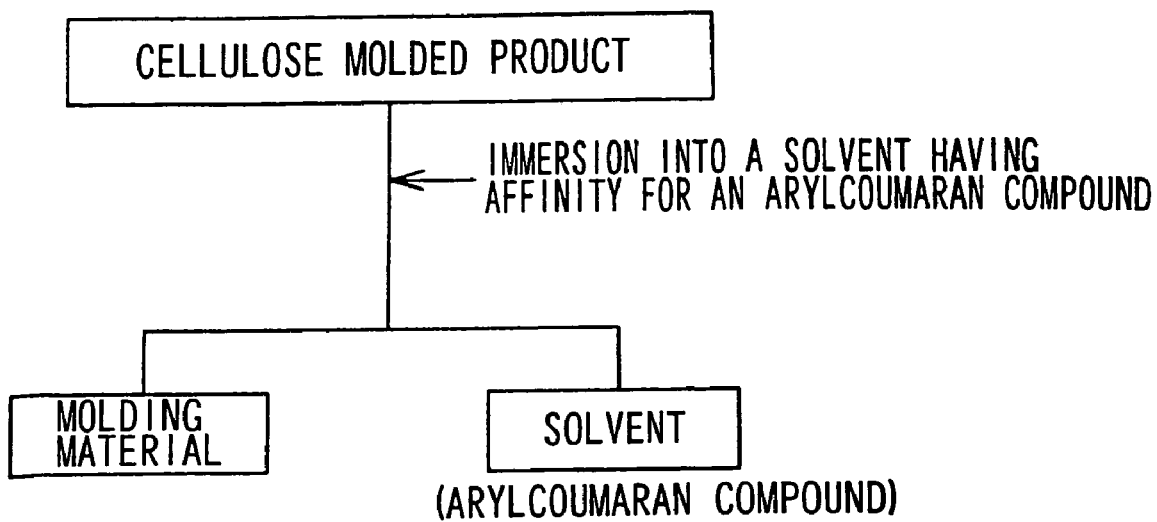
FIG. 32 is a view showing steps for recovering a secondary derivative and a substrate constituting material from a molded product.

Further, as shown in FIG. 32, by adding again a solvent to the present molded product, the product can be separated into fibers and an arylcoumaran derivative, which can be recovered.

The arylcoumaran derivative is extracted from the molded product using a solvent having affinity for the arylcoumaran derivative (hereinafter referred to as the present solvent).

In this case, the present solvent may be acetone, ethanol, methanol, dioxane, tetrahydrofuran, a mixture of one of these solvents and water, or an aqueous alkali solution and the like. Considering simplicity, acetone and alcohol are preferable. In addition, considering the cost, an aqueous alkali solution is preferable.

More particularly, during the recovery of the arylcoumaran derivative, whether the original shape of the molded product is maintained or the molded product is processed into small pieces, the molded product or the small pieces are dipped into a solvent having affinity for the arylcoumaran derivative and further stirred. As a result, the arylcoumaran derivative is extracted into the solvent. By processing the molded product into small pieces and stirring into the solvent, rapid separation and extraction become possible. Alternatively, when the original shape of the molded product is desired to be maintained, the arylcoumaran derivative is dipped into a solvent having affinity for the arylcoumaran derivative, but the solvent is non-aqueous (for example, acetone) and allowed to stand to extract without stirring. In particular, in the case of a molding substrate material using a cellulose system, when the arylcoumaran derivative is intended to be extracted and, at the same time, the molded product is intended to be separated into molding materials by splitting or the like, the molded product is dipped into an aqueous alkali solution and stirred.

As such, the recovered arylcoumaran derivative can be utilized again in various fields in addition to preparation of molded products. In addition, molding substrate materials that were separated at the same time can be utilized again in various fields in addition to preparation of molded products.

(Recovery of a Lignin Cross-linking Derivative from a Molded Product)

In addition, when the molded product is prepared by heating without cross-linking, the lignin cross-linking derivative can be recovered from the molded product using a solvent having affinity for the lignin cross-linking derivative, as was the case for the arylcoumaran derivative. Solvent having affinity for the lignin cross-linking derivative are acetone, ethanol, methanol, dioxane, tetrahydrofuran, a mixture of one of these solvents and water, or an aqueous alkali solution and the like. Considering simplicity, acetone and alcohol are preferable. In addition, considering the cost, an aqueous alkali solution is preferable.

According to the present invention, a lignophenol derivative is obtained from various lignocellulose materials via a phase separating process with a phenol derivative and concentrated acid and this derivative is further secondarily-derivatized to obtain an arylcoumaran derivative or a lignin cross-linking derivative that can be complexed with various fibers to prepare a molded product. The derivative and the fiber material in the molded product are separated from the molded product. Therefore, by using an arylcoumaran derivative and a cross-linking derivative as a material for molding, preparation of the molded product and separation can be repeatedly performed. Therefore, a lignocellulose can be efficiently reused.

Arylcoumaran derivatives produced according to the present invention can be used as an ultraviolet absorber or a lignin material having low protein absorbing properties.

Lignin cross-linking derivative s produced according to the present invention can be used as a switching element, a hydrophilic high protein absorber, an ultraviolet absorber or the like.

EXAMPLES

Figure 33:
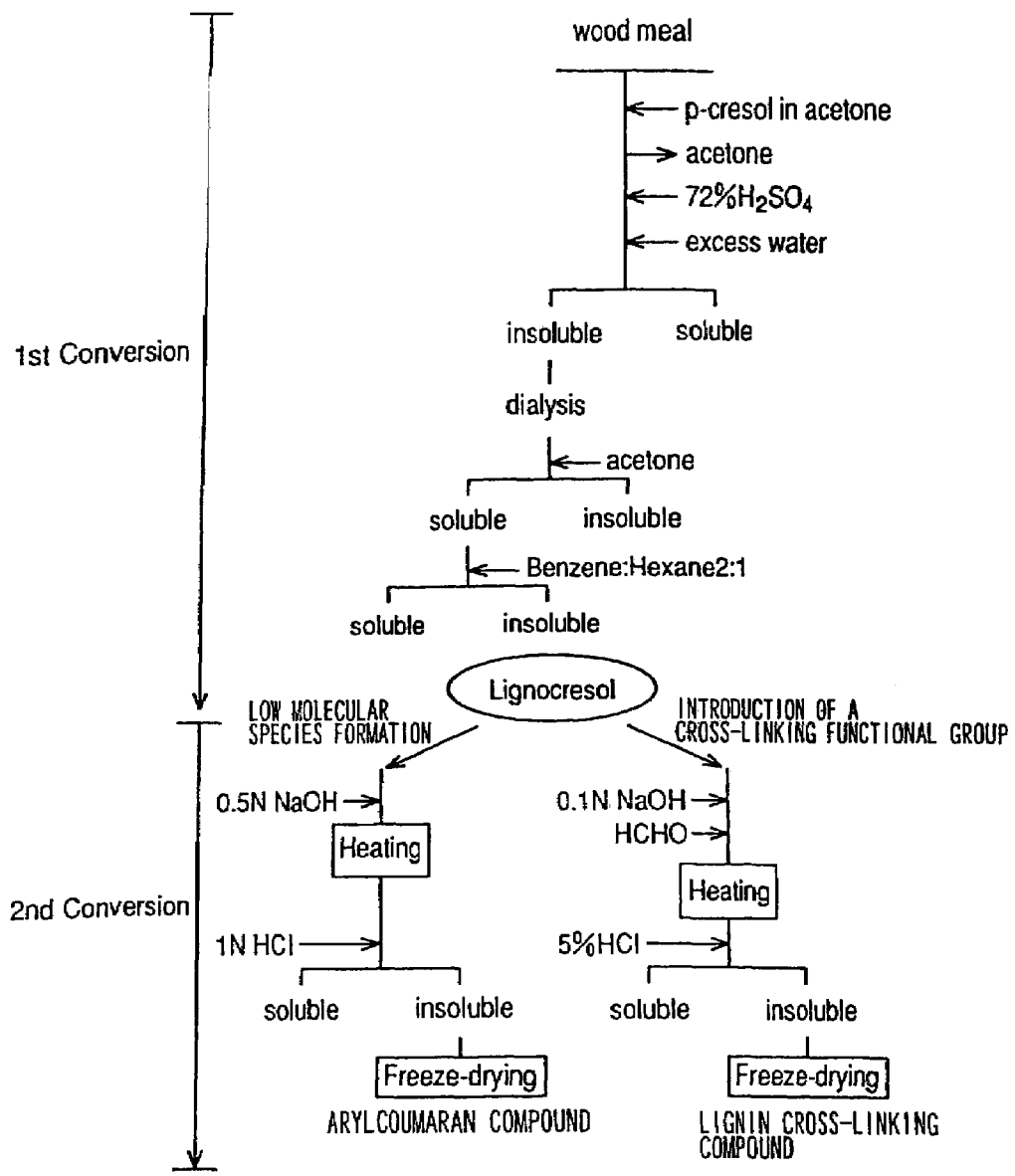
FIG. 33 is a view showing the steps of examples 1 to 3.

The following Examples illustrate the present invention. In the following Examples, preparation of a molded product of a cellulose fiber using an arylcoumaran derivative and a lignin cross-linking derivative, and recovery of each derivative from a molded product are explained. The steps of Examples 1 to 3 are shown in FIG. 33.

Example 1

(Synthesis of a Lignophenol Derivative)

Lignocresol as a lignophenol derivative was synthesized using *Pinus Thunbergii* as the lignocellulose material according to the following steps. That is, to *Pinus Thunbergii* defatted wood powder was added an acetone solution containing about 3 mole-amounts per lignin $C_9$ unit in the *Pinus Thunbergii* defatted wood powder and the mixture was well stirred and allowed to stand overnight to impregnate the wood powder with p-cresol. Thereafter, the wood powder was thinly spread in a vat and allowed to stand in a draft until the acetone odor is lost due to distillation of the acetone. The amount of $C_9$ unit in the lignin in the *Pinus Thunbergii* defatted wood powder was calculated based on elementary analysis of the lignin in the *Pinus Thunbergii* defatted wood powder.

Then, 250 g of wood powder with p-cresol adsorbed thereon was placed into a beaker, and 1200 ml of 72% sulfuric acid was added thereto while stirring with a glass bar. After stirred for about 10 minutes, the mixture was further stirred with a stirrer for 1 hour and thereafter, the reaction was stopped by the addition of 10 L of water. After allowing it to stand for a few days, the precipitate fraction was deacidified by dialysis. After the precipitate was dried in a drier at 40° C. for a few days, the lignophenol derivative fraction was extracted with acetone, the acetone fraction was added dropwise to a large excess of benzene:hexane (2:1) (v/v) while stirring, and the produced precipitate was washed with ethyl ether. Afterwards, the precipitate was dried at room temperature and atmospheric pressure, and dried over phosphorus pentaoxide under reduced pressure to obtain the lignophenol derivative (lignocresol).

The molecular weight, the amount of introduced cresol, the hydroxyl group distribution and the phenolic property frequency of this lignophenol derivative are shown in FIGS. 34 and 35.

Example 2

Synthesis of an Arylcoumaran Derivative 4 g of the lignophenol derivative obtained in Example 1 was dissolved in 80 ml of a 0.5N aqueous sodium hydroxide solution, was placed into a stainless steel autoclave and heated at 140° C. for 6 hours and allowed to react. The reaction was stopped by cooling, acidified to pH 2 with 1N hydrochloric acid, the produced precipitate was collected by centrifuging, and washed to neutral. The resulting precipitate was lyophilized and dried over phosphorus pentaoxide under reduced pressure to obtain an arylcoumaran derivative. The molecular weight, the amount of introduced cresol, the hydroxyl group distribution and phenolic property frequency are shown in FIGS. 34 and 35.

Example 3

Synthesis of a Lignin Cross-linking Derivative

Lignocresol was obtained according to the same method as that of Example 1. The molecular weight and the amount of introduced cresol of this lignocresol are shown in FIG. 36.

20 g of this lignophenol derivative was placed into three-necked flask, was dissolved with 1.2 L of a 0.1N aqueous sodium hydroxide solution, and 180 ml of a 37% formaldehyde solution (corresponding to 20 mole-amount of formaldehyde relative to introduced cresol and the main lignin structure aromatic ring) was added, heated at 60° C. for 3 hours to introduce the cross-linking functional group. The reaction was stopped by cooling, acidified to pH 2 with 5% hydrochloric acid and the whole solution was transferred into a dialysis membrane, where the acid and unreacted formaldehyde were removed. After dialysis, a sample was recovered by lyophilizing and dried over phosphorus pentaoxide under reduced pressure to obtain the lignin cross-linking derivative. The molecular weight and the amount of introduced cresol of this lignin cross-linking derivative are shown in FIG. 36. In addition, the hydroxyl group distribution and the amount of hydroxymethyl thereof are shown in FIG. 37.

Example 4

Attachment of Various Derivatives to a Cellulose Fiber Mat

Regenerated paper was used as the cellulose material, was dipped into water overnight, splitted well and thereafter, fibers were aggregated using a cylinder having a diameter of about 10 cm. Then, the aggregate was dehydrated and dried to prepare a mat having a diameter of about 100 mm and a thickness of 9 mm.

A mat piece A, 20 mm×90 mm, for preparing sample for the strength test, and a mat piece B, 20×20 mm, for preparing a sample for the water absorbing test were cut and taken from this fiber mat using a motor disc saw.

(1) Preparation of a Mat for the Strength Test

The lignophenol derivative obtained in Example 1 or the arylcoumaran derivative obtained in Example 2 was attached to this mat piece A at a ratio of 5%, 10% or 20% by weight. In addition, the lignin cross-linking derivative was attached to a mat piece A at a rate of 15% by weight. That is, the aforementioned lignophenol derivative, the arylcoumaran derivative or the lignin cross-linking derivative was dissolved in acetone separately to prepare a solution for attachment, and a predetermined amount of the aforementioned solution for attachment was added separately so that the lignophenol derivative or the arylcoumaran derivative was attached to various mat pieces at a rate of 5%, 10% or 20%, respectively, in a cylindrical stainless steel container having a diameter of 10 cm. The lignin cross-linking derivative obtained in Example 3 was attached to mat piece A at a ratio of 15%, which was dipped in the solution overnight to allow the solution to thoroughly permeate for attachment into mat piece A. Thereafter, acetone was gradually evaporated while turning over mat piece A every 1 hour, to attach various derivatives to mat piece A.

Mat piece A was removed from the container at the point in time when the acetone appeared to completely evaporated from the container based upon visual observation, the remaining acetone in the interior of the mat was evaporated in a blast drier at 60° C., and the weight was measured. The initial weight of a mat was subtracted from the weight after attachment of the derivative to calculate the amounts of various derivatives.

With regard to mat piece A having an attached cross-linking derivative, after the cross-linking derivative was attached thereto, heating treatment was performed at 170° C. for 60 minutes to prepare a heat-treated material.

(2) Preparation of a Mat for the Water Absorbing Test

The lignophenol derivative obtained in Example 1 or the arylcoumaran derivative obtained in Example 2 was attached to mat piece B at a ratio of 5%, 10% or 20% by weight, respectively, similar to the mat for the strength test. In addition, a lignin cross-linking derivative was attached to a mat piece B at a ratio of 20% by weight, similar to the mat for the strength test.

Moreover, mat pieces B with various derivatives attached were heated at 170° C. for 60 minutes to prepare heat-treated materials, respectively (only heat-treated material was prepared for the mat piece having the attached lignin cross-linking derivative).

For comparison in assessment described below, a control mat piece with nothing attached thereto was made according to the same steps as those of this Example, except for the attaching step. Also regarding the control mat piece, a heat-treated compound was prepared by heating at 170° C. for 60 minutes.

Example 5

Assessment

Various mats thus prepared were tested for the following items.

(Appearance)

The various mat pieces were observed with the naked eye.

The various mat pieces turned brown as a whole, and heat-treated materials made by heat-treating the mat pieces were all uniformly and densely colored.

(Mat Strength Test)

Figure 38:
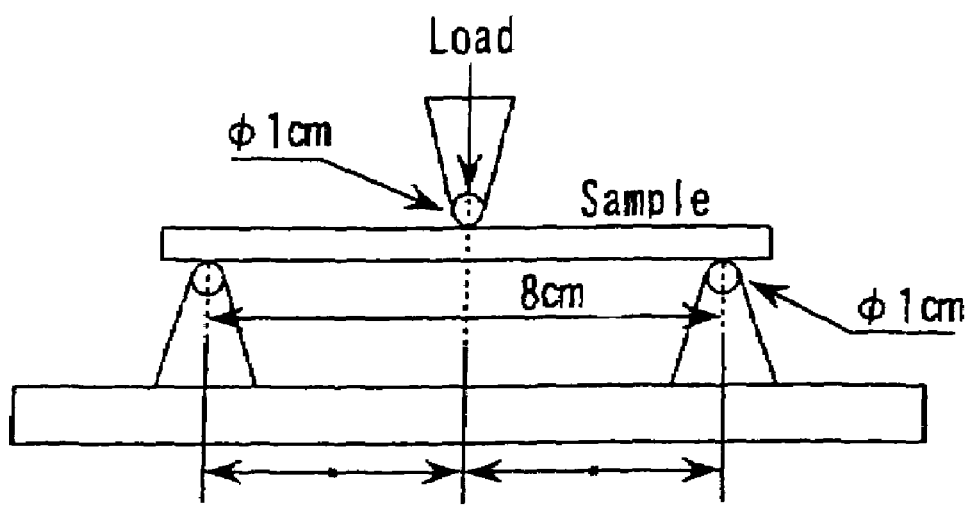
FIG. 38 is a view showing the state where a test piece is supported and a load is applied in a strength test.

Mat piece A for the strength test and the control mat piece were tested using a span length of 80 mm and using the steel apparatus shown in FIG. 38 for supporting the test piece and providing a load. A concentrated load was applied to the entire width of a span center from the surface of the test piece and the average load rate was 2 mm/min.

According to this test apparatus and method, a load-deflection curve was prepared and, from this curve, modulus of elasticity (MOE) and modulus of rupture in bending (MOR) were calculated. In addition, Pmax was calculated.

Figure 39:
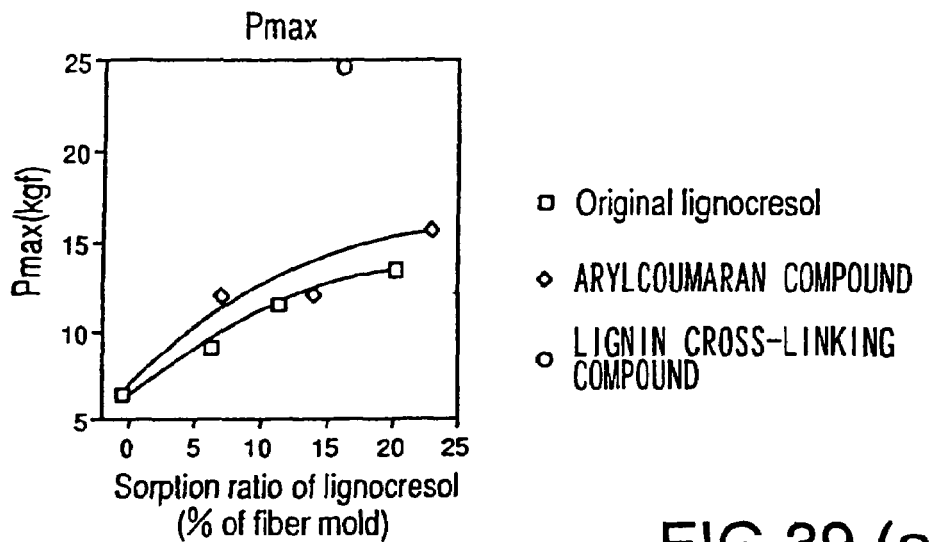
FIG. 39(*a*) is a graphical view showing Pmax.
Figure 39:
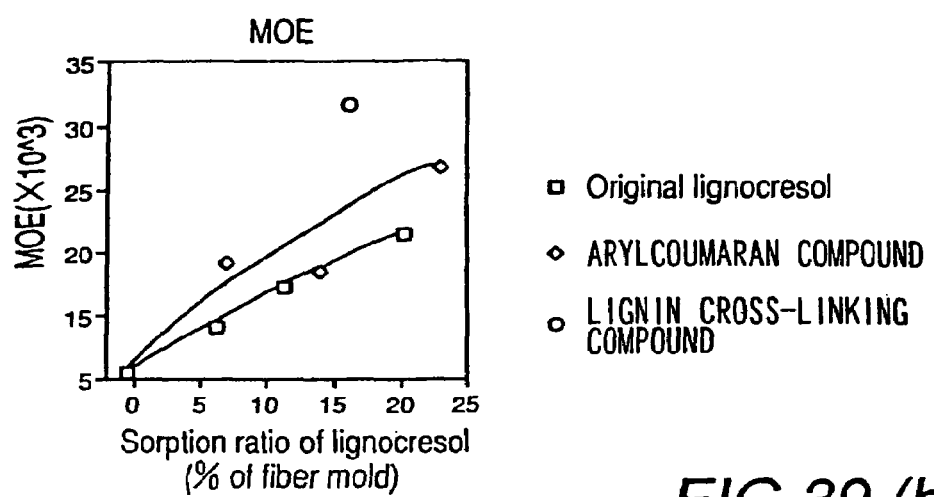
Figure 39:
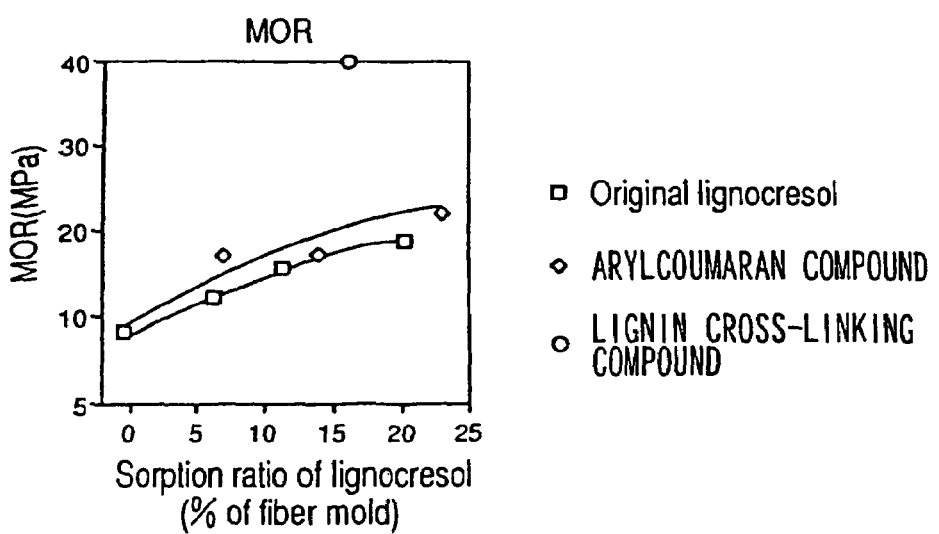

The results are shown in FIGS. 39(a), 39(b) and 39(c).

From the results of FIGS. 39(a), 39(b) and 39(c), the arylcoumaran derivative was excellent for each of Pmax, modulus of elasticity and modulus of rupture in bending as compared with the lignophenol derivative. Therefore, it was seen that the molded product with the arylcoumaran derivative attached thereto has the increased strength as compared with the corresponding molded product using the lignophenol derivative. In addition, it was seen that the arylcoumaran derivative has improved function as a binder, even when it was obtained by low-molecularizing the lignophenol derivative.

Moreover, the molded product (heat-treated material) using the cross-linking derivative had a much greater Pmax, modulus of elasticity and modulus of rupture in bending than those of the arylcoumaran derivative and it was seen that the strength can be greatly improved.

(Water Absorbing Test)

A stainless steel net was placed on the bottom of a vat, water was added so that the distance from the net bottom to the surface of water was 3 cm and the temperature of water was maintained at 25° C. Mat piece B prepared for the water absorbing test was immersed therein and a stainless steel net as a weight was placed on the upper surface of mat piece B and allowed to stand for 1 hour in order to maintain the upper surface of test piece B at 3 cm under the surface of the water, so as not to float.

Figure 41:
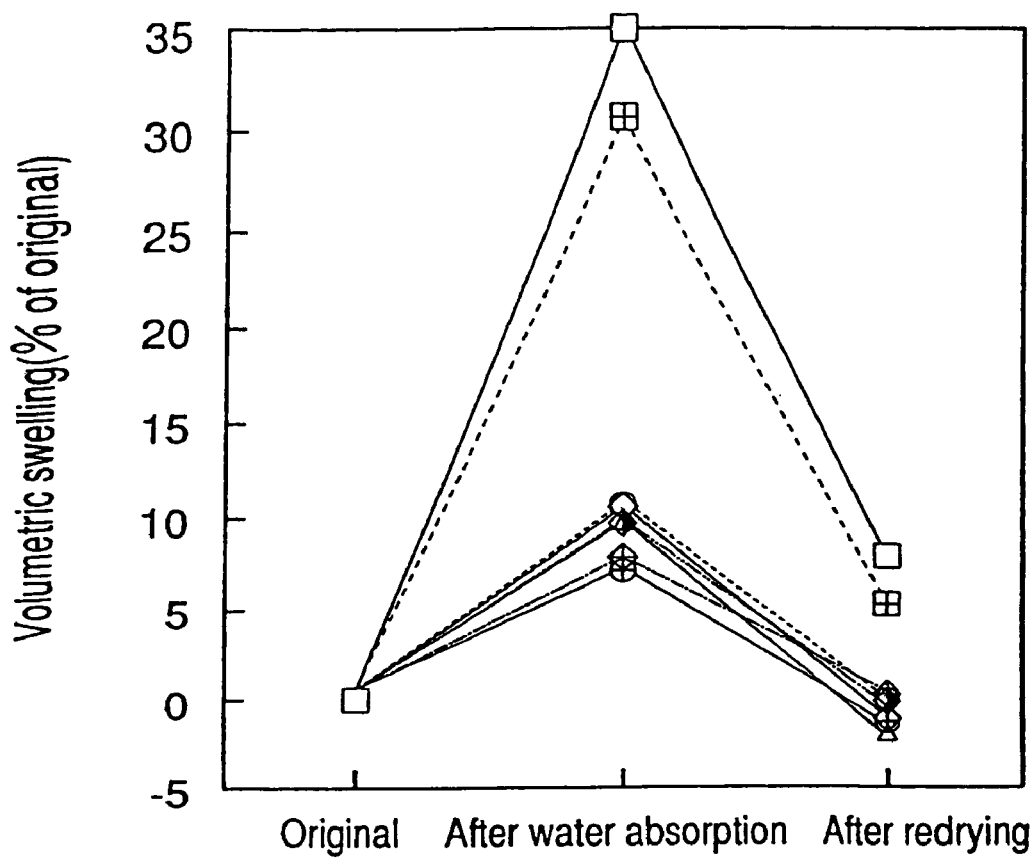
FIG. 41 is a graphical view showing volumetric change rates of a molded cellulose product using an arylcoumaran derivative.
Figure 42:
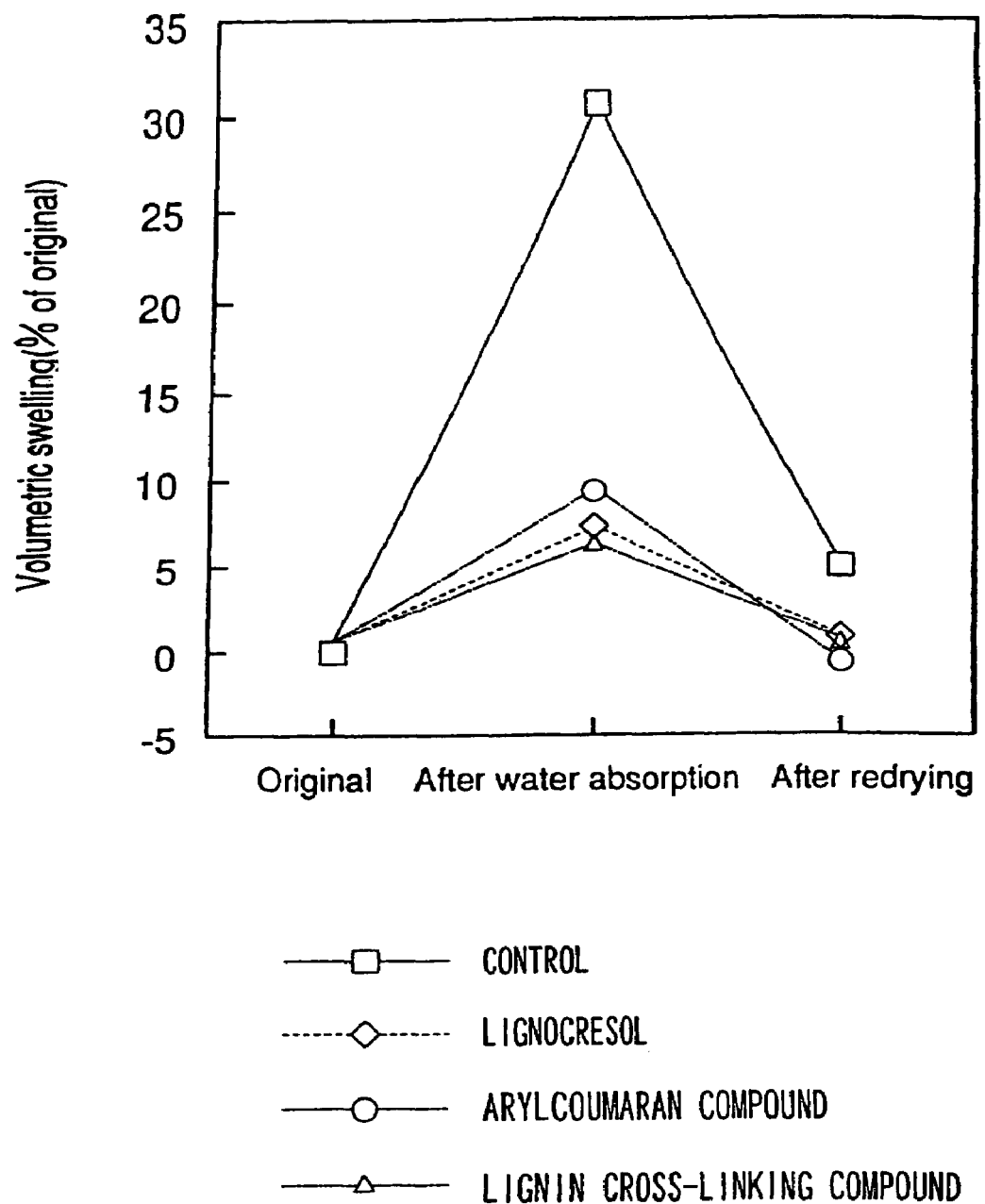
FIG. 42 is a graphical view showing volumetric change rates of molded cellulose products using a lignophenol derivative, an arylcoumaran derivative and a lignin cross-linking derivative, respectively, by comparison.

After a predetermined period of time, the immersed mat piece B was taken out, placed on a stainless steel net and after 10 minutes, the test piece was rapidly rolled onto a filer to remove water droplets on the surface thereof, the weight and dimensions were measured and a volumetric change rate relative to before immersion in water was calculated. The results thereof are shown in FIGS. 40 to 42.

In addition, mat piece B after immersion in water was allowed to stand at 105° C. for 15 hours in a drier, removed, cooled, and the weight and dimensions thereof were measured. A volumetric change rate of mat piece B after drying was calculated and compared with the volumetric change rate after immersion in water in order to assess the dimensional stability of the molded product. The results are also shown in FIGS. 40 to 43.

Figure 40:
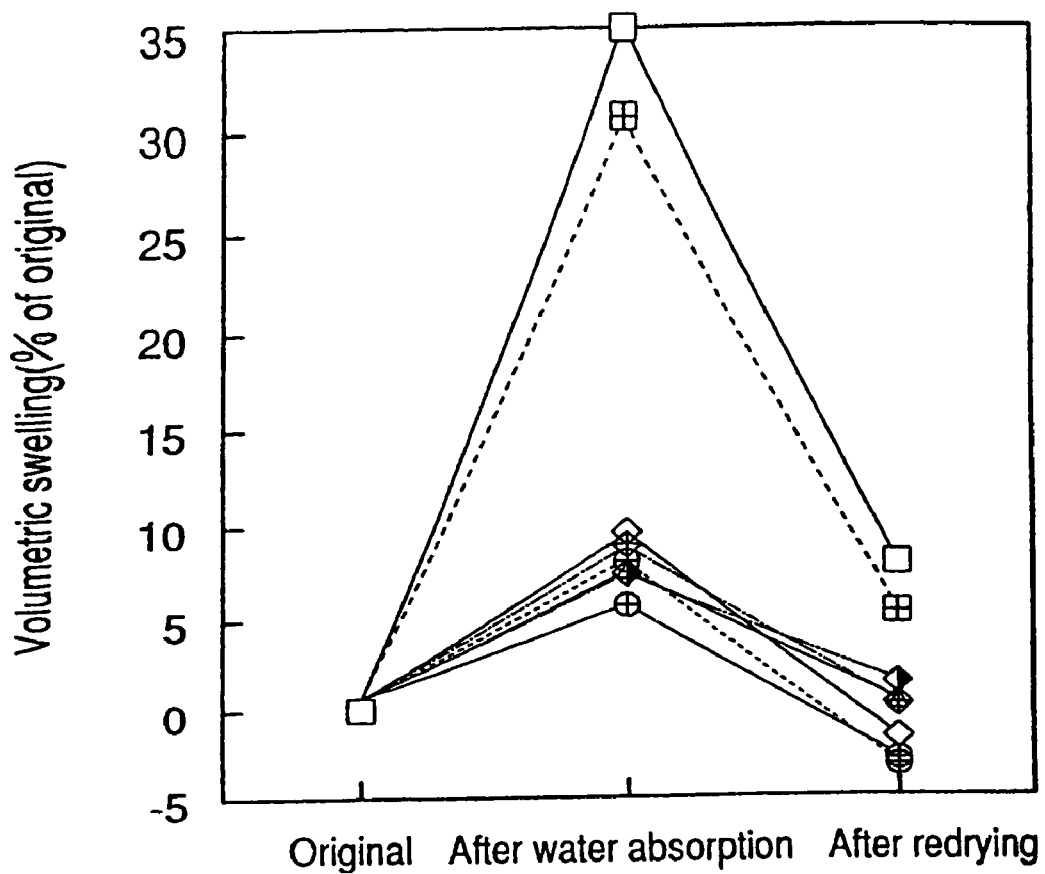
FIG. 40 is a graphical view showing volumetric change rates of a molded cellulose product using a lignophenol derivative.

As is apparent from the results of FIG. 40, the unheated material of the heat-treated material of mat pieces B with a lignophenol derivative attached thereto at various amounts displayed a volumetric change rate of about 5 to 10% and after drying, had a volumetric change rate of about −3 to 2%.

To the contrary, mat pieces B with an arylcoumaran derivative attached thereto (unheated material and heat-treated material) had a volumetric change rate of about 7 to 10% and after drying, had about −1 to 1%. That is, although the volumetric change rate after immersion in water was similar to that of the molded product with the lignophenol derivative attached thereto and there was no great difference, after re-drying, the volume was as great as that before immersion in water (see FIG. 41). Therefore, the dimensional stability of a mat piece B with an arylcoumaran derivative, attached thereto can be said to be better. In addition, the amount of water absorption was almost same as that of the lignophenol derivative.

In addition, although mat piece B with the cross-linking derivative attached thereto had a volumetric change rate of about 7% after immersion in water, the volume returned back to nearly that before immersion in water after re-drying and thus, it was seen that mat piece B with the cross-linking derivative attached thereto had better dimensional stability. With respect to water absorption, mat piece B with the cross-linking derivative attached thereto had about 60% of the water absorption of that of the mat piece B with the arylcoumaran derivative attached thereto and that of mat piece B with the lignophenol derivative attached thereto; thus, it was seen that water-resistance was improved by cross-linking (see FIG. 42, in this figure, comparison was performed on a heated material of each derivative having an attached amount of 20%).

From these results, it was clear that by attaching the arylcoumaran derivative or the lignin cross-linking derivative obtained by further secondarily-derivatizing lignocresol to a molding substrate material, the water absorption of the mat was reduced. As a result, dimensional stability with respect to moisture was imparted thereto. In particular, this tendency was remarkable in mat piece B with the lignin cross-linking derivative attached thereto (heat-treated material).

Example 6

Test for Recovering Lignocresol from a Board

Mat piece B for the water absorption test with each of a lignophenol derivative, an arylcoumaran derivative and a cross-linking derivative was prepared according to Example 4, and was used as a mat piece for the recovery test. With respect to the material with the lignophenol derivative attached thereto and the material with the arylcoumaran derivative attached thereto, a non-heated material and a heat-treated material (170° C., 60 min.) were prepared to obtain a mat piece for the recovery test and, with respect to the lignin cross-linking derivative, a heat-treated material (170° C., 60 min.) was used as the mat piece for the recovery test. The amount of each derivative to be attached was 20% by weight per weight of the cellulose fiber in every case.

These mats were immersed into about 30 ml of THF in a vial. Afterwards, they were allowed to stand for 2 days without stirring, the immersion solution was filtered, washed with THF, the filtrate and the washing solution were combined, THF was distilled off, and the resulting fraction was used as a recovery fraction. The results are shown in FIG. 44.

As apparent from the results of FIG. 44, 100% of the arylcoumaran derivative was recovered.

The better recovery rate is further effective in that the arylcoumaran derivative does also not remain on one side of the cellulose material. A trace of a lignin cross-linking derivative was recovered due to its cross-linked structure.

In addition, in the case of the lignophenol derivative and the arylcoumaran derivative, cellulose material was recovered in the reusable state.

As such, according to the first invention and the fourth invention, lignin that is a component of a lignocellulose complex structure of a forest resource can be efficiently utilized and a new functional material can be provided.

According to the fifth invention, a molded product can be provided that can be easily incorporated into a molding substrate material and can be again separated and reused together with a molding substrate and a binder material.

According to the sixth invention, a molded product can be provided that has water-resistance and strength.

According to the seventh invention, an arylcoumaran derivative can be efficiently and repeatedly utilized and a molding substrate material can be efficiently reused.

The invention claimed is:

1. A molded product comprising:
   at least one lignin-based polymer comprising a cross-linking lignin based polymer having a plurality of diphenylpropane units, where an ortho-position or para-position of a phenol or a phenol derivative is bound via a carbon-carbon bond to a benzyl position of a phenylpropane unit of lignin and at least one cross-linking functional group having a hydroxylmethyl group is bound to an ortho-position and/or a para-position with respect to a phenolic hydroxyl group within the diphenylpropane unit and/or a cross-linked lignin based polymer, where at least two cross-linking functional groups of said cross-linking lignin based polymer are cross-linked to each other; and
   a molding substrate material comprising a cellulose based material.

2. A molded product as in claim 1, wherein said cross-linking lignin based polymer has a weight-average molecular weight of about 2,000 to 10,000.

3. A molded product as in claim 1, wherein said cross-linking lignin based polymer has a molar ratio of the cross-linking functional group to the modified phenylpropane unit of about 0.3 to 1.5.

4. A molded product as in claim 1, wherein the ortho-position of the phenol or phenol derivative is bound to the benzyl position of the phenylpropane unit.

5. A molded product as in claim 1, wherein the at least one cross-linking functional group is bound only to the ortho-position and/or the para-position with respect to the phenolic hydroxyl group of an aryl ring within the lignin.

6. A molded product as in claim 1, wherein at least two cross-linking functional groups are bound to the ortho-position and/or the para-position with respect to the phenolic hydroxyl group of the phenol, the phenol derivative or an aryl ring within the lignin.

7. A molded product as in claim 1, wherein the m-cresol or p-cresol is bound via a carbon-carbon bond to the benzyl position of a phenylpropane unit of the lignin.

8. A molded product as in claim 1, wherein 2,4-xylenol or 2,6-xylenol is bound via a carbon-carbon bond to the benzyl position of a phenylpropane unit of the lignin.

9. A method of producing molded product comprising the step of:
   molding a molding substrate material using at least one lignin-based polymer containing cross-linking lignin based polymer having a plurality of diphenylpropane units, where an ortho-position or para-position of a phenol or a phenol derivative is bound via a carbon-carbon bond to a benzyl position of a phenylpropane unit of a lignin and at least one cross-linking functional group having a hydroxylmethyl group is bound to an ortho-position and/or a para-position with respect to a phenolic hydroxyl group within the diphenylpropane unit and/or a cross-linked lignin based polymer, where at least two cross-linking functional groups of said cross-linking lignin based polymer are cross-linked to each other as a binder,
   wherein said molding substrate material comprises a cellulose based material.

10. A method as in claim 9, wherein said step provides a molding substrate material with a solution solvating at least one lignin-based polymer, and evaporating solvent of the solution from the molding substrate material.

11. A method as in claim 9, wherein said solvent is selected from acetone, ethanol, methanol, dioxin, teterahydrofuran or is a mixture of at least one of said solvents and water.

12. A method of treating a molded product comprising the steps of:
    providing a solvent which solvates a cross-linking lignin based polymer, to a molded product including the cross-linking lignin based polymer having a plurality of diphenylpropane units, where an ortho-position or para-position of a phenol or a phenol derivative is bound via a carbon-carbon bond to a benzyl position of a phenylpropane unit of lignin and at least one cross-linking functional group having a hydroxylmethyl group is bound to an ortho-position and/or a para-position with respect to a phenolic hydroxyl group within the diphenylpropane unit and/or a cross-linking lignin based polymer, where at least two cross-linking functional groups of said cross-linking lignin based polymer are cross-linked to each other; and
    recovering the cross-linking lignin based polymer,
    wherein said molded product comprises a cellulose based material.

13. A method as in claim 12, wherein said solvent is selected from acetone, ethanol, methanol, dioxin, tetrahydrofuran or is a mixture of at least one of said solvents and water.

14. A method as in claim 12, said method further comprising providing the solvent which solvates a cross-linking lignin based polymer, by soaking the molded product in the solvent.

15. A method as in claim 12, said method further comprising recovering the cross-linking lignin based polymer as well as a molding substrate material of the molded product.

* * * * *